(12) United States Patent
Sakurai et al.

(10) Patent No.: US 7,777,957 B2
(45) Date of Patent: Aug. 17, 2010

(54) OPTICAL FILTER AND TUNABLE FILTER

(75) Inventors: Yasuki Sakurai, Aichi (JP); Naoyuki Mekada, Aichi (JP)

(73) Assignee: Santec Corporation, Komaki (JP)

( * ) Notice: Subject to any disclaimer, the term of this patent is extended or adjusted under 35 U.S.C. 154(b) by 52 days.

(21) Appl. No.: 12/334,597

(22) Filed: Dec. 15, 2008

(65) Prior Publication Data

US 2009/0153984 A1 Jun. 18, 2009

(30) Foreign Application Priority Data

Dec. 14, 2007 (JP) ............................. 2007-322878

(51) Int. Cl.
*G02B 27/10* (2006.01)
(52) U.S. Cl. .................................................. 359/618
(58) Field of Classification Search ......... 359/618–640, 359/885–892; 398/41–103
See application file for complete search history.

(56) References Cited

OTHER PUBLICATIONS

Gnauck, A. et al., "Optical Equalization of 42.7-Gbaud Bandlimited RZ-DQPSK Signals", IEEE Photonics Technology Letters, Oct. 1, 2007, pp. 1442-1444, vol. 19, No. 19, IEEE.

*Primary Examiner*—Darryl J Collins
(74) *Attorney, Agent, or Firm*—Smith Patent Office

(57) ABSTRACT

A light from an optical fiber is incident on a dispersive element via an optical circulator and an optical fiber. The dispersive element disperses the incident light toward directions different depending on wavelength to apply the dispersed lights to a lens. The lens focuses the lights at positions different for each wavelength of the light. The patterning plate has desired reflection characteristics. The lights reflected on the patterning plate are multiplexed by the dispersive element through the identical path to be emitted from an optical fiber via the optical circulator. Desired characteristics can be obtained by arbitrarily changing a pattern with reflection characteristics of the patterning plate. In addition, a characteristic of the optical filter can be changed by moving the patterning plate.

14 Claims, 30 Drawing Sheets

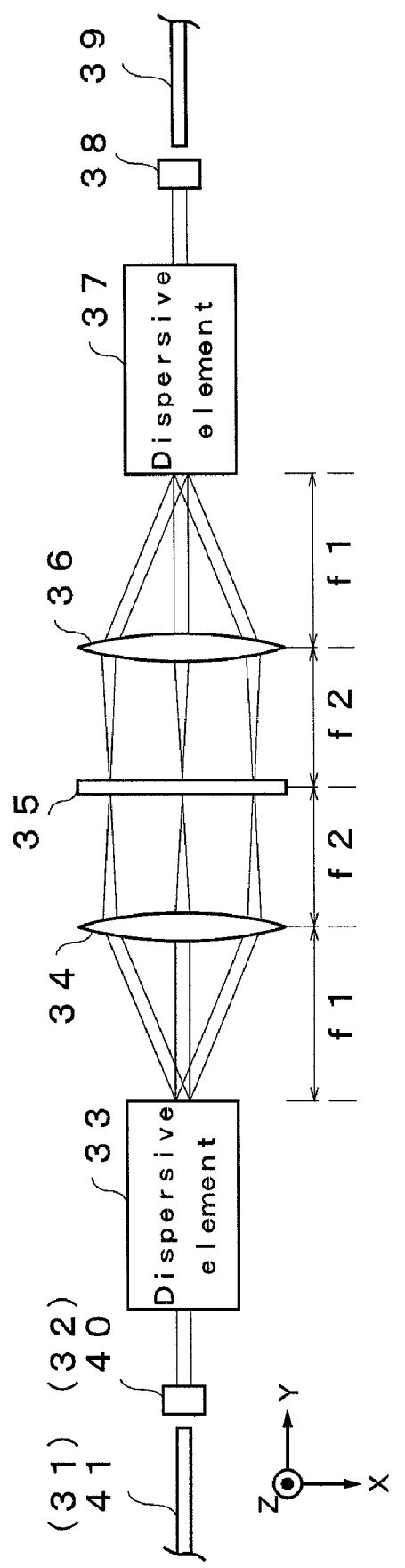

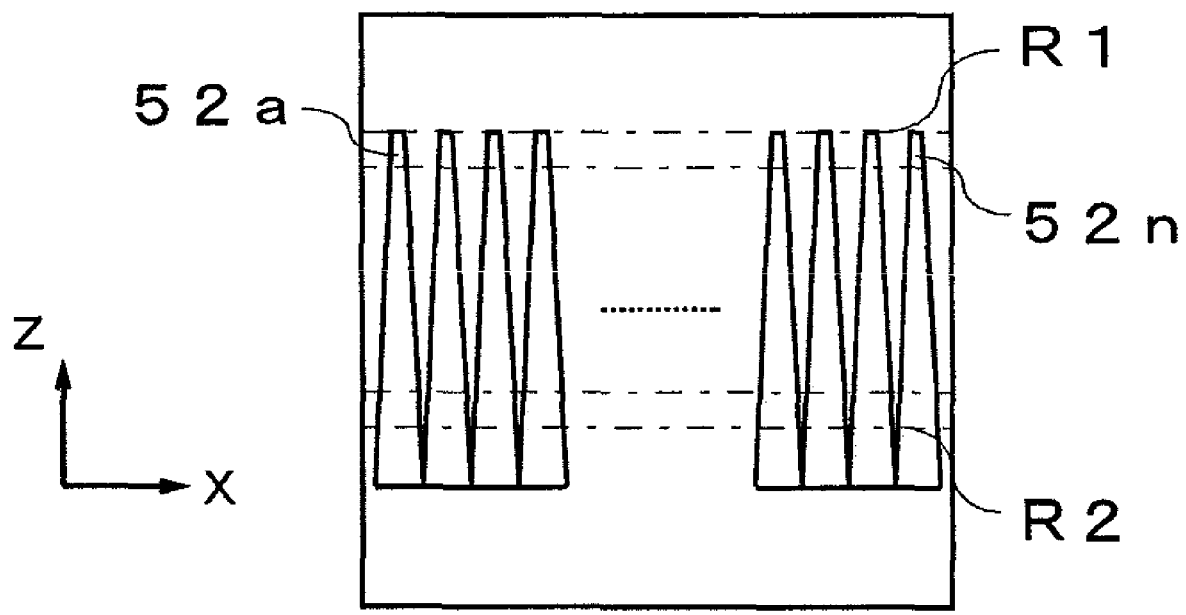
F I G. 10

F I G. 1 7 A
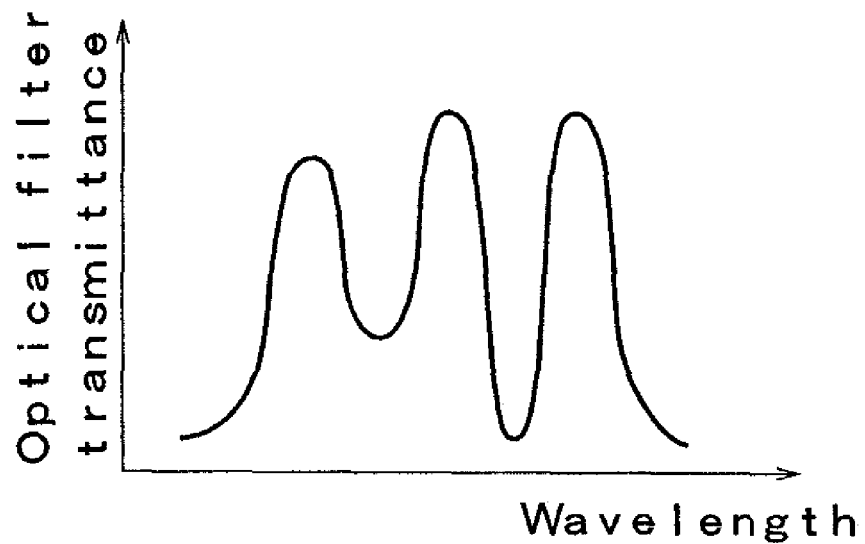
F I G. 1 7 B
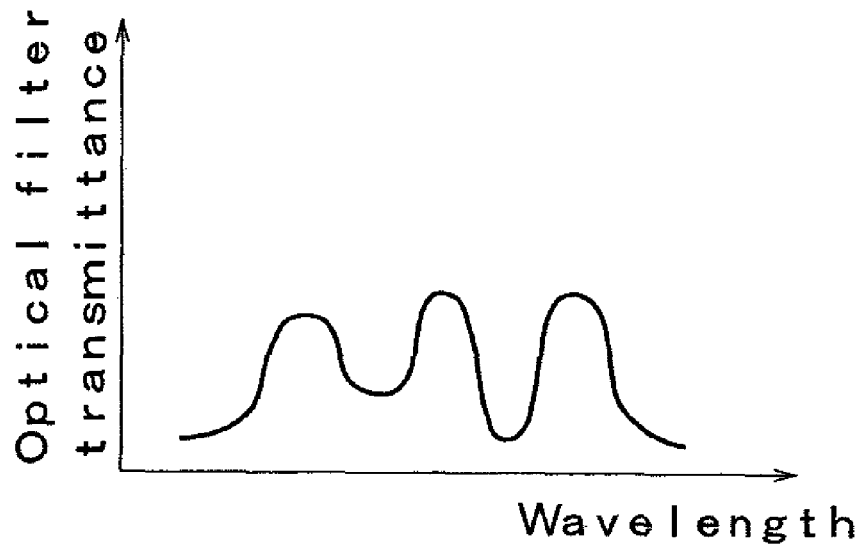

F I G. 1 8
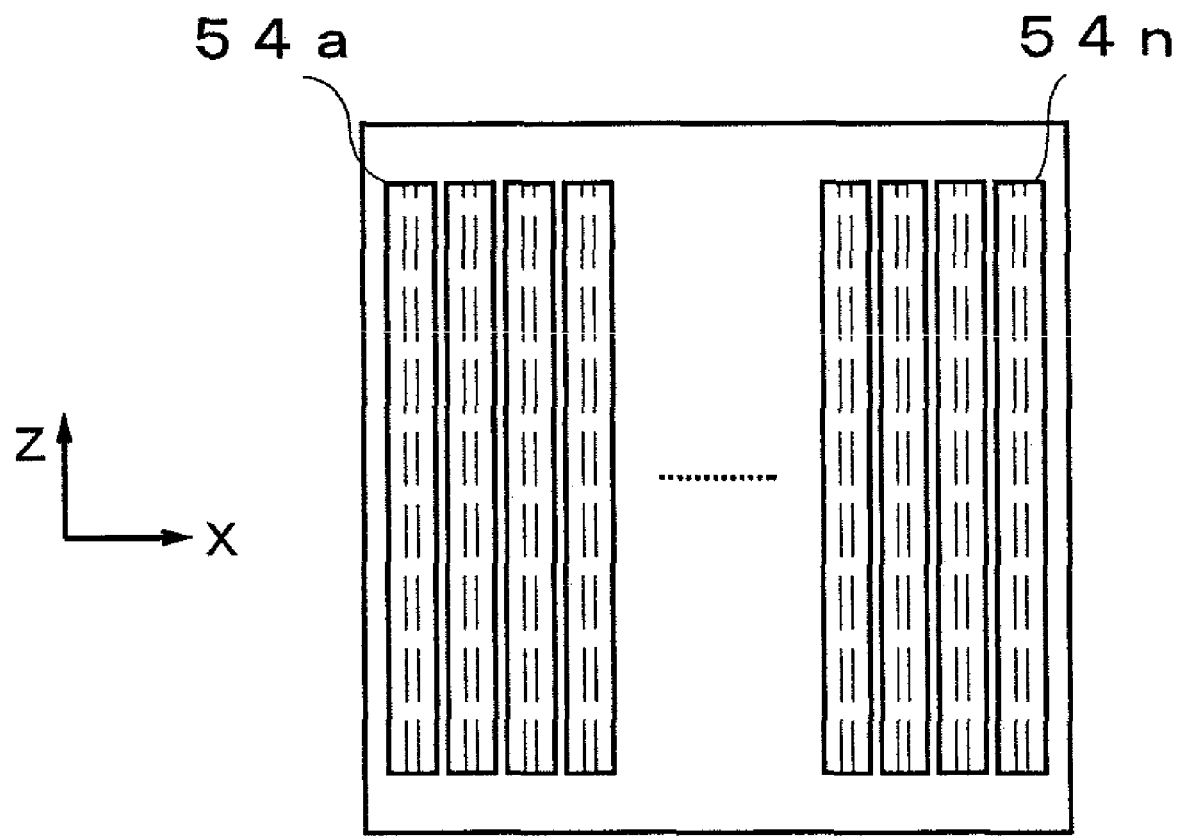

F I G. 2 0
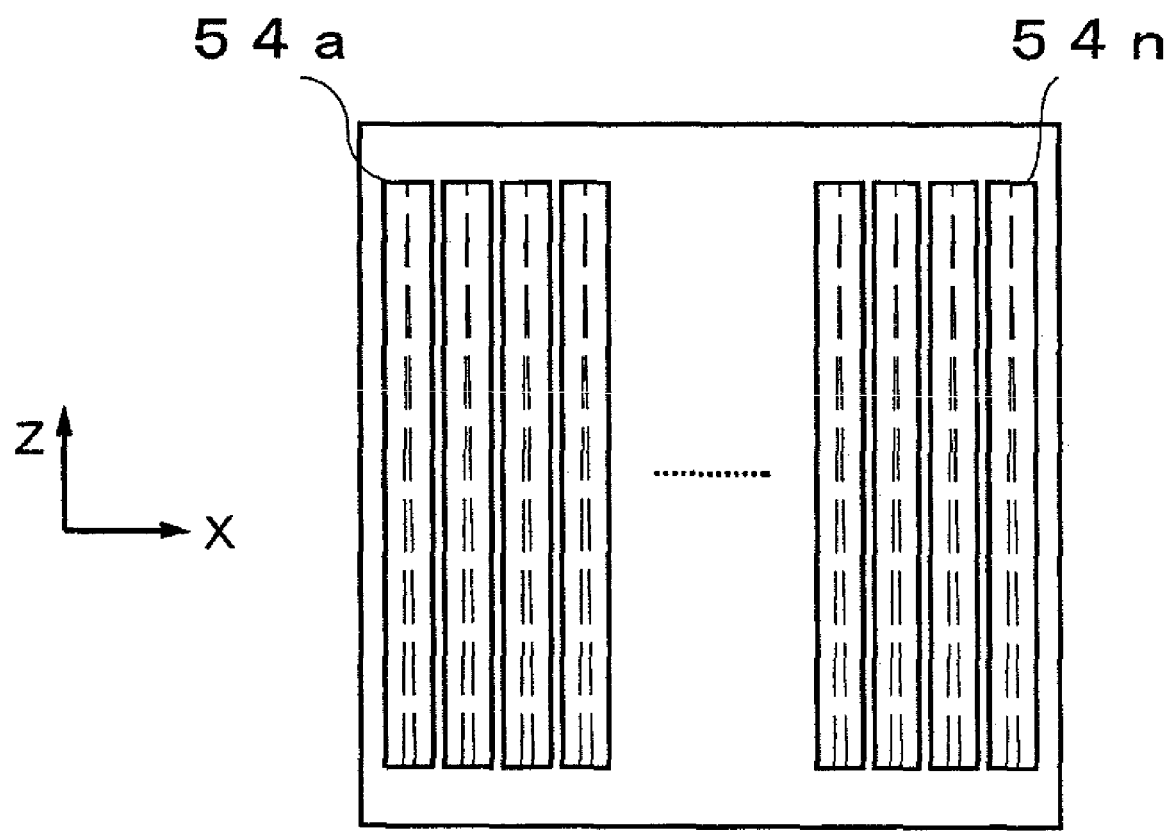

F I G. 2 6
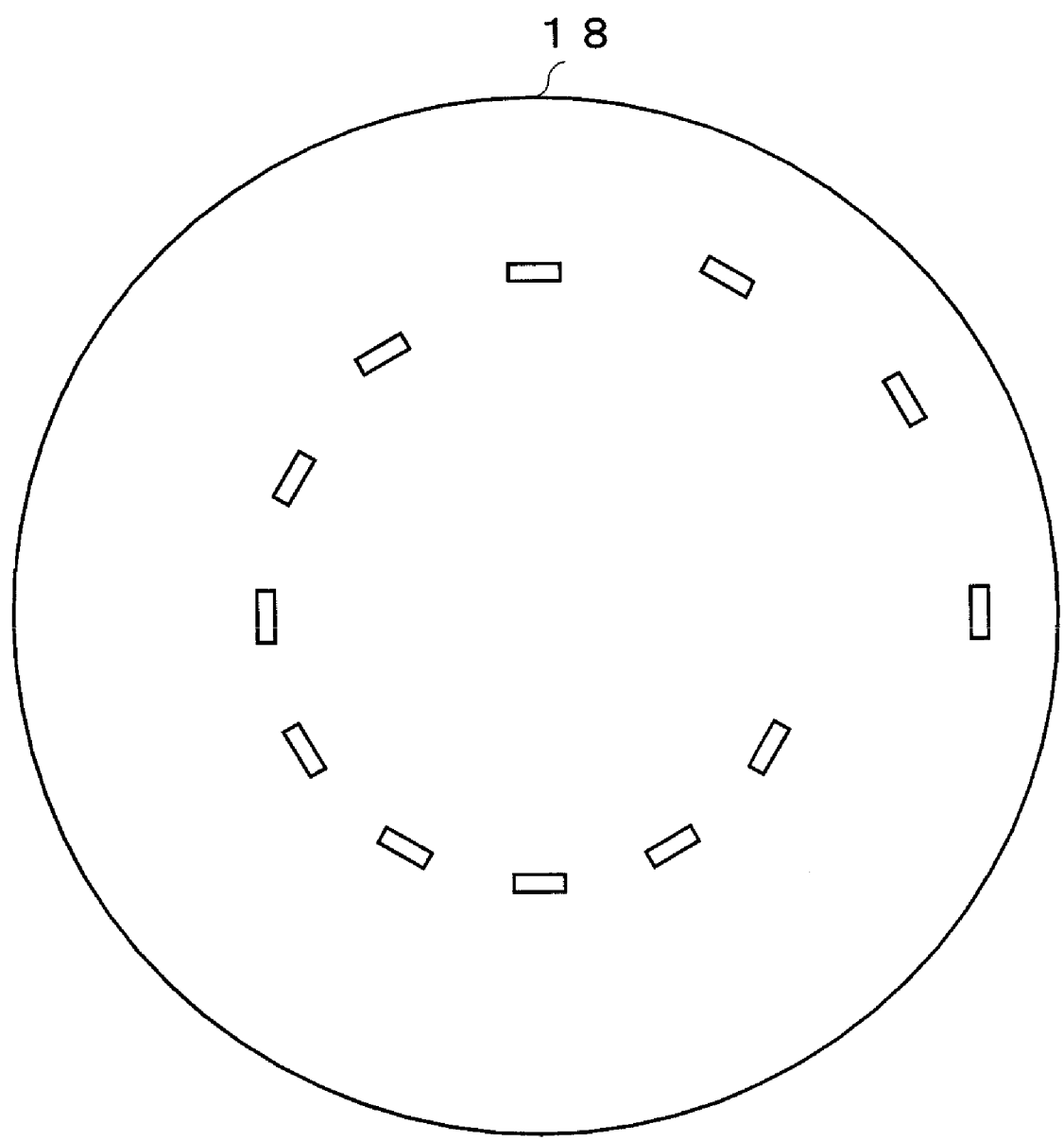

F I G. 2 8
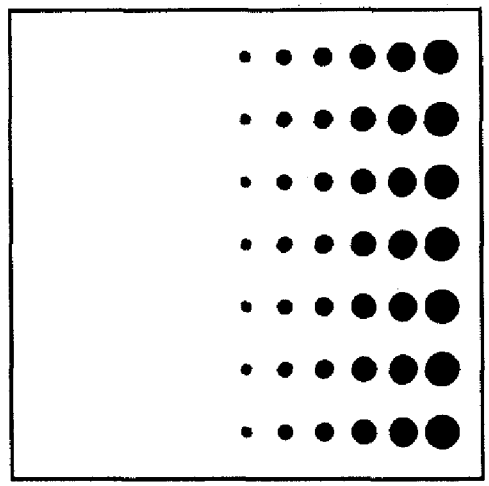
F I G. 2 9
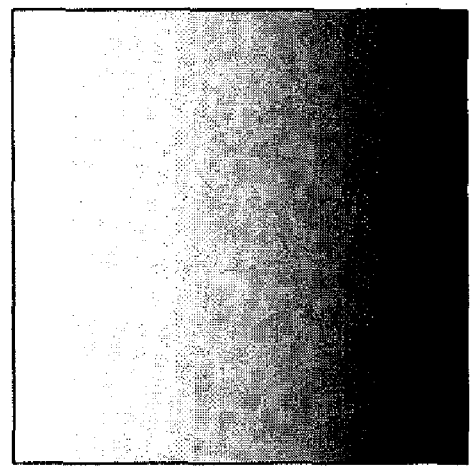

OPTICAL FILTER AND TUNABLE FILTER

BACKGROUND OF THE INVENTION

1. Field of the Invention

The present invention relates to an optical filter and a tunable filter which are able to convert a spectrum of an optical signal into a desired spectrum.

2. Discussion of the Related Art

An optical filter and a tunable filter are widely used in many fields such as the optical communication and the spectroscopic analysis. In the optical communication field, optical filters each realizing various spectral shapes such as a wavelength selection function for selecting (passing or blocking) a certain wavelength, a gain equivalence function for equalizing spectra which passed through an optical amplifier to have gain different in each wavelength and for conforming their optical power levels, and an interleaving function for branching a WDM signal into signal groups of odd channels and even channels. As shown in IEEE Photon. Technol. Lett., vol. 19, no. 19, pp. 1442-1444, October 2007, a method for realizing speeding up an optical transmission signal by passing the optical transmission signal through an optical filter realizing complex spectral shapes has been proposed recently. For this reason, the spectral shapes required for the optical filter are increasingly diversified and complicated.

As a conventional optical filter and a tunable optical filter, a dielectric multilayer filter made by in turn stacking a plurality of materials with different refractive indexes, an optical filter employing an optical fiber Bragg grating made by applying modulation of a refractive index (a diffraction grating) on a core of optical fiber, and further a Fabry-Perot etalon filter using a multiple interference between two reflectors are used. The dielectric multilayer filter has great freedom of designing the spectral shapes, and thus is most widely used especially for realizing an optical filter having a specific spectrum.

SUMMARY OF THE INVENTION

However, the dielectric multilayer filter cannot realize in principle a wavelength spectrum having a plurality of passbands and a wavelength spectrum having a steep edge. For various applications expected hereafter, an optical filter in absolutely different principle which considerably improved a degree of freedom of spectral shape is desired.

The present invention is realized in consideration of such conventional faults, and intends to provide an optical filter able to obtain desired characteristics and an optical tunable filter able to change a spectral shape.

To solve the problems, an optical filter of the present invention comprises: a dispersive element for dispersing an incident light for each wavelength of the light to emit the dispersed light and for multiplexing selected reflected lights again toward an opposite direction of said incident light; a focusing element for focusing lights of wavelengths dispersed for each wavelength by said dispersive element on an identical plane with keeping a relative relationship of incident position; and a patterning plate which is provided at a position where belt-shaped lights from said focusing element are focused on and which reflects lights of predetermined wavelengths at predetermined reflectance.

The optical filter may further comprises: a circulator for making a light incident on said dispersive element and for emitting the reflected light multiplexed by said dispersive element toward a direction different from that of said incident light.

Said patterning plate may reflect a light of wavelength to be selected to said dispersive element and reflects lights of other wavelengths toward different directions.

To solve the problems, an optical filter of the present invention comprises: a first dispersive element for dispersing an incident light for each wavelength of the light to emit the dispersed light; a focusing element for focusing lights of wavelengths dispersed for each wavelength by said first dispersive element on an identical plane with keeping a relative relationship of incident position; a patterning plate which is provided at a position where belt-shaped lights from said focusing element are focused on and which transmits lights of predetermined wavelengths at predetermined transmittance; a light collection element for collecting lights of respective wavelength which transmitted said patterning plate; and a second dispersive element for multiplexing dispersed lights collected by said light collection element.

Said patterning plate may transmit a light of wavelength to be selected to said dispersive element and may reflect lights of other wavelengths.

Said patterning plate may form a reflection pattern by changing at least one of a density of reflection particles on its surface and a thickness of reflection film on its surface.

To solve the problems, an optical filter of the present invention comprises: a dispersive element for dispersing an incident light for each wavelength of the light to emit the dispersed light and for multiplexing selected reflected lights again toward an opposite direction of said incident light; a focusing element for focusing lights of wavelengths dispersed for each wavelength by said dispersive element on an identical plane with keeping a relative relationship of incident position; a patterning plate which is provided at a position where belt-shaped lights from said focusing element are focused on and which reflects lights of predetermined wavelengths at predetermined reflectance; and a driver for driving said patterning plate to be moved or to be rotated.

The optical filter may further comprises: a circulator for making a light incident on said dispersive element and for emitting the reflected light multiplexed by said dispersive element toward a direction different from that of said incident light.

Said patterning plate may reflect a light of wavelength to be selected to said dispersive element and may reflect lights of other wavelengths toward different directions.

To solve the problems, an optical filter of the present invention comprises: a first dispersive element for dispersing an incident light for each wavelength of the light to emit the dispersed light; a focusing element for focusing lights of wavelengths dispersed for each wavelength by said first dispersive element on an identical plane with keeping a relative relationship of incident position; a patterning plate which is provided at a position where belt-shaped lights from said focusing element are focused on and which transmits lights of predetermined wavelengths at predetermined transmittance; a light collection element for collecting lights of respective wavelength which transmitted said patterning plate; a second dispersive element for multiplexing dispersed lights collected by said light collection element; and a driver for driving said patterning plate to be moved or to be rotated.

Said patterning plate may transmit a light of wavelength to be selected to said dispersive element and may reflect lights of other wavelengths.

Said patterning plate may form a reflection pattern by changing at least one of a density of reflection particles on its surface and a thickness of reflection film on its surface.

As described in detail above, according to the present invention, an optical filter having arbitrary characteristics can be realized by variously changing reflection characteristics and transmission characteristics of a patterning plate. In addition, an optical tunable filter which freely changes wavelength selection characteristics can be realized by moving the patterning plate.

BRIEF DESCRIPTION OF THE DRAWINGS

FIG. 4A is a side view seen from a Z axis direction of a reflective optical filter and an optical tunable filter according to a fourth embodiment of the present invention;

FIG. 10 is a view showing a pattern of another patterning plate and an incident position of a light;

FIG. 17A is a graph showing a relationship between transmittance of an optical filter using this patterning plate and a wavelength;

FIG. 17B is a graph showing the relationship between the transmittance of the optical filter using this patterning plate and the wavelength;

FIG. 18 is a view showing an example of pattern of another patterning plate;

FIG. 20 is a view showing another example of pattern of a patterning plate;

FIG. 26 is a view showing another example of pattern of a patterning plate;

FIG. 28 is a view showing a change of a reflective density of a patterning plate;

FIG. 29 is a photographic view showing a change of thickness of a reflective film of a patterning plate;

DESCRIPTION OF THE PREFERRED EMBODIMENTS

First Embodiment

Figure 1A:
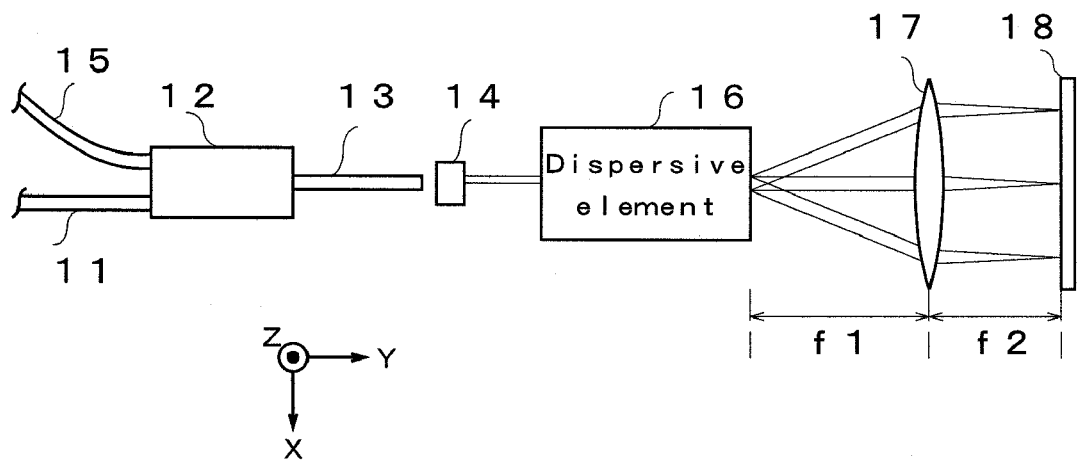
FIG. 1A is a side view seen from a Z axis direction of a reflective optical filter and an optical tunable filter according to a first embodiment of the present invention.
Figure 1B:
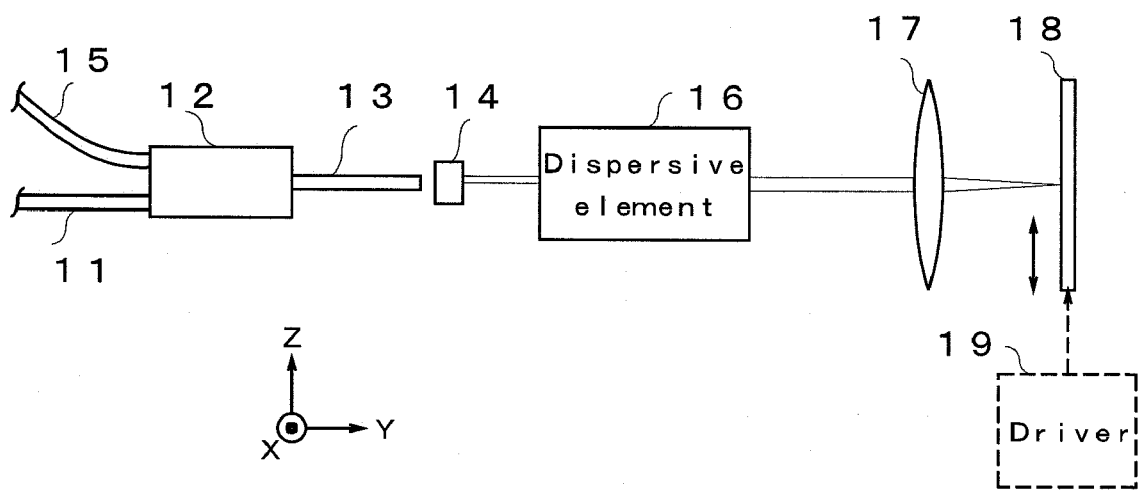
FIG. 1B is a side view seen from an X axis direction of the reflective optical filter and the optical tunable filter according to the first embodiment of the present invention.

FIG. 1A is a side view seen from a Z axis direction showing a configuration of a reflective optical filter according to a first embodiment of the present invention, and FIG. 1B is a side view seen from an X axis direction according to the embodiment. In these figures, an incident light is applied to a circulator 12 via an optical fiber 11. The incident light may be inputted to the circulator 12 via the optical fiber 11, and may be directly inputted to the circulator 12. The circulator 12 emits the incident light to a collimate lens 14 via an optical fiber 13, and emits a light incident from the optical fiber 13 to an optical fiber 15. In addition, the light emitted from the optical fiber 13 via the collimate lens 14 is incident on a dispersive element 16. The dispersive element 16 disperses the light toward directions different depending on a wavelength on an XY plane. The dispersive element 16 may be a transmission or reflection diffraction grating, and a prism, a VIPA (Virtually Imaged Phased Array) and the like may be used. The VIPA is a dispersive element made by coating a reflective film on both surfaces of a thin plate. A light dispersed by the dispersive element 16 is applied to a lens 17. A distance between the dispersive element 16 and the lens 17 is equal to a focal length f1 of the lens 17. The lens 17 is a focusing element for focusing the light dispersed on the XY plane in parallel toward the Y axis direction, and the light is incident on a patterning plate 18 arranged away from the lens 17 for a focal length f2. Three lights of different wavelengths is shown as an example here. However, when an incident light has a continuous spectrum, a belt-shaped output broadened along the XY plane is applied to the patterning plate 18. The patterning plate 18 partially reflects an incident light, which will be described in detail below. The light reflected by the patterning plate 18 is applied to the lens 17 with passing through the identical path, and is applied to the dispersive element 16 again. The dispersive element 16 focuses a reflected light to the identical path of the original incident light, and emits the focused light to the optical fiber 13 via the collimate lens 14. The circulator 12 emits this light to the optical fiber 15. Here, transmission characteristics of the optical filter are determined based on reflection characteristics of the patterning plate 18.

Second Embodiment

Figure 2A:
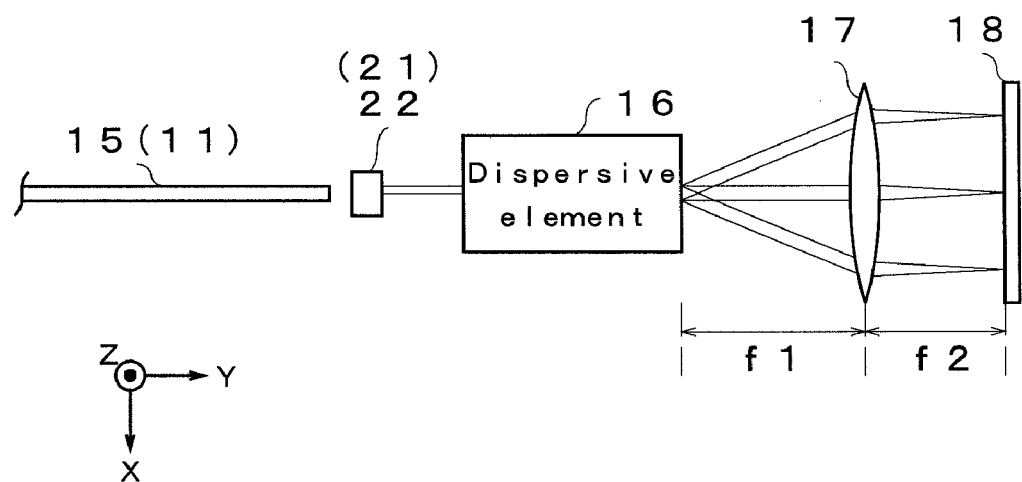
FIG. 2A is a side view seen from a Z axis direction of a reflective optical filter and an optical tunable filter according to a second embodiment of the present invention.
Figure 2B:
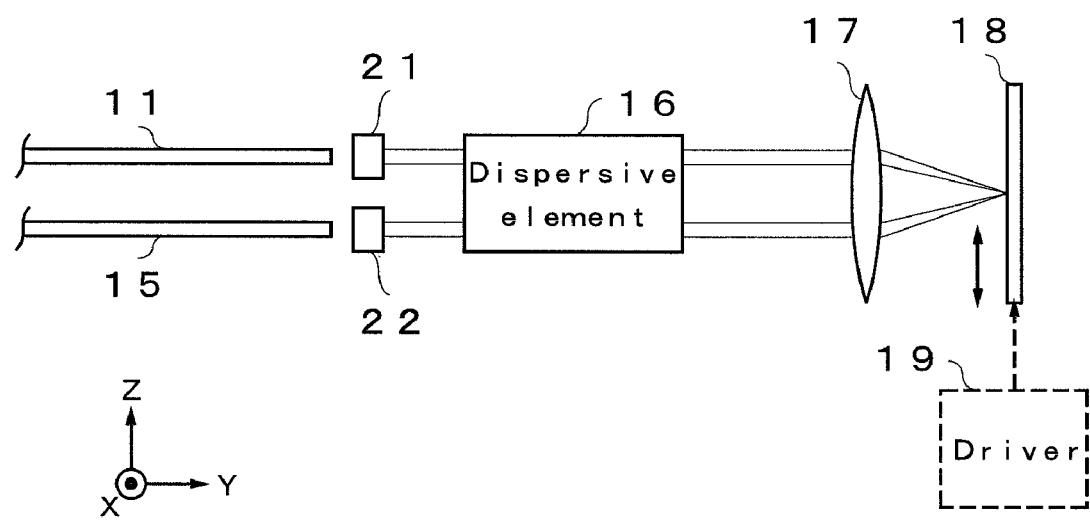
FIG. 2B is a side view seen from an X axis direction of the reflective optical filter and the optical tunable filter according to the second embodiment of the present invention.

A reflective optical filter according to a second embodiment of the present invention will be explained. FIG. 2A is a side view seen from a Z axis direction showing a configuration of a reflective optical filter according to the second embodiment of the present invention, and FIG. 2B is a side view seen from an X axis direction according to the embodiment. The identical numerals are added to the portions identical with those of the first embodiment. In this embodiment, a light emitted from the optical fiber 11 is directly inputted to the dispersive element 16 via a collimator 21. In addition, an incident light and an emitted light differ in position each other along the Z axis direction on the dispersive element 16 as shown in FIG. 2B, and thus a light is incident on the patterning plate 18 via the lens 14. According to this, the incident light and the emitted light are separated without using the circulator 12.

In the above mentioned first and second embodiment, as shown in FIG. 1B and FIG. 2B, the patterning plate 18 may be moved along the Z axis direction on the XZ plane by a driver 19 shown by a broken line. When the patterning plate 18 has various reflection characteristics arranged along the Z axis direction, the reflection characteristics can be changed in accordance with movement of the patterning plate 18, resulting in realization of a reflective optical tunable filter having various spectrum shapes. The moving direction of the patterning plate 18 is not limited to the Z axis direction, and the patterning plate 18 may be moved on the XZ plane or may be rotated on the XZ plane. Here, the various reflection characteristics are arranged along a direction of the movement or the rotation, details thereof will be described below.

Third Embodiment

Figure 3A:
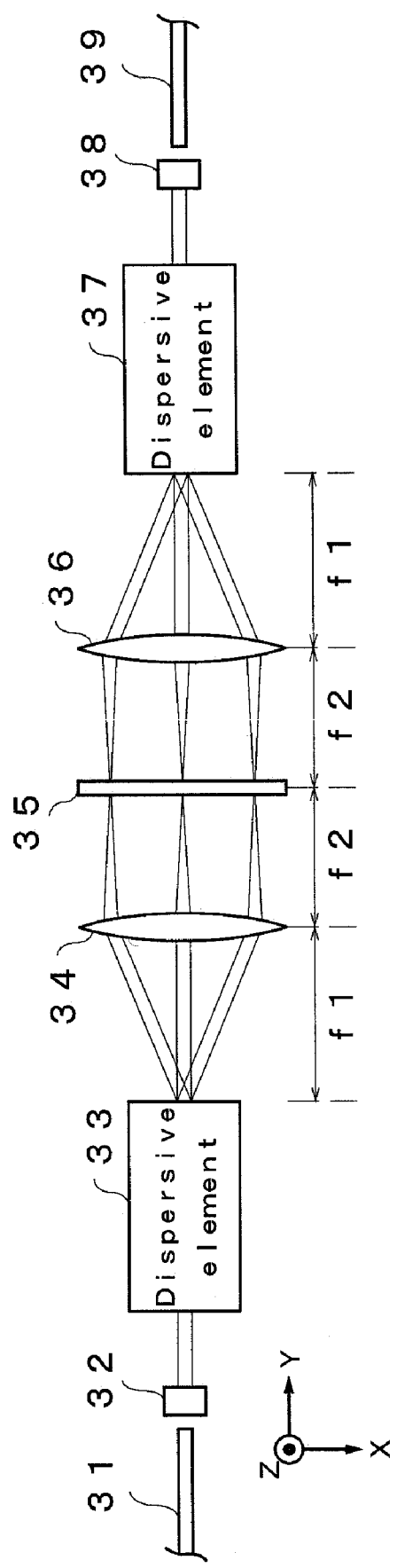
FIG. 3A is a side view seen from a Z axis direction of a reflective optical filter and an optical tunable filter according to a third embodiment of the present invention.
Figure 3B:
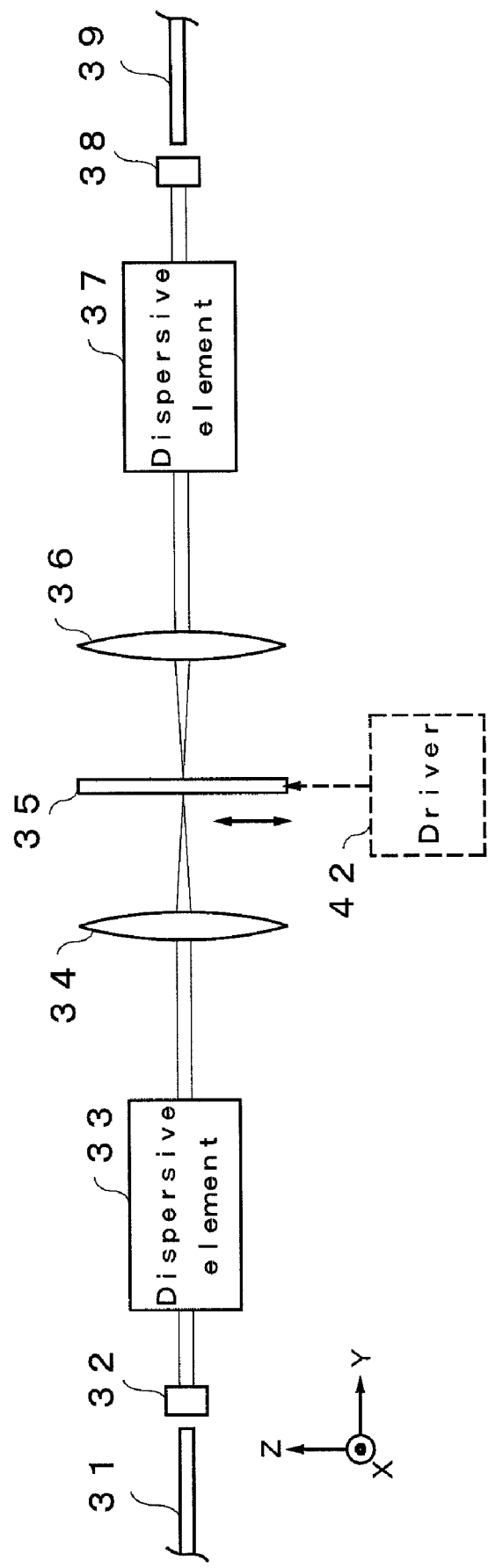
FIG. 3B is a side view seen from an X axis direction of the reflective optical filter and the optical tunable filter according to the third embodiment of the present invention.

A transmission optical filter according to a third embodiment of the present invention will be explained. FIG. 3A is a side view seen from a Z axis direction showing a configuration of a transmission optical filter according to the third embodiment of the present invention, and FIG. 3B is a side view seen from an X axis direction according to the embodiment. In FIG. 3A, an incident light is incident on a collimate lens 32 from an optical fiber 31, and is applied to a first dispersive element 33 as a parallel optical beam. The diffraction grating, a prism, and a VIPA are used for the dispersive element 33 same as that of the first embodiment. The dispersive element 33 emits lights in directions different for each wavelength of the lights on the XY plane. All of these lights are incident on the lens 34. A distance between the dispersive element 33 and the lens 34 is equal to a focal length f1 of the lens 34. The lens 34 is a focusing element for focusing the light dispersed on the XY plane in parallel toward the Y axis direction. In addition, a patterning plate 35 is arranged away from the lens 34 for a focal length f2 of the lens 34. The patterning plate 35 partially passes an incident light, and details thereof will be described below. A light which passed the patterning plate 35 is incident on a lens 36. The lens 34 and the lens 36 are arranged in symmetrical with respect to a center line of the patterning plate 35, and the second dispersive element 33 and a dispersive element 37 are arranged in the same manner. The dispersive element 37 multiplexes lights of different wavelengths from different direction and emits the multiplexed light. The lens 36 is a light collection element for collecting parallel lights on the XY plane. The light multiplexed by the dispersive element 37 is applied to an optical fiber 39 via a collimate lens 38.

Fourth Embodiment

Figure 4B:
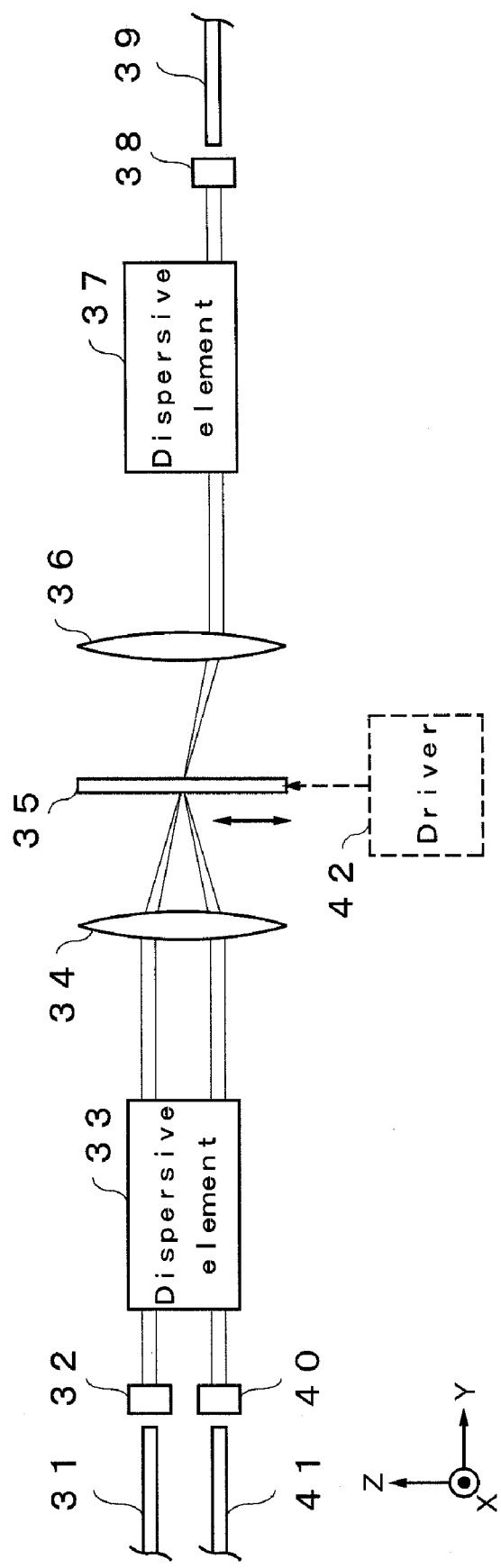
FIG. 4B is a side view seen from an X axis direction of the reflective optical filter and the optical tunable filter according to the fourth embodiment of the present invention.

Referring to FIG. 4A and FIG. 4B, a transmission optical filter according to a fourth embodiment of the present invention will be explained. FIG. 4A is a side view seen from a Z axis direction showing a configuration of a transmission optical filter according to the fourth embodiment of the present invention. FIG. 4B is a side view seen from an X axis direction according to the embodiment. In this embodiment, explanation of the portions identical with those of the third embodiment is omitted by adding the identical numerals to the portions. In the fourth embodiment, incident positions of incident collimated lights are slightly different from those of the third embodiment, that is, as shown in FIG. 4B, the incident lights are focused on the patterning plate 35 with being slightly shifted along the Z axis direction by the lens 34. Thus, a light passing the patterning plate 35 is applied to the dispersive element 37, and emitted from the optical fiber 39 in the same manner as that of the third embodiment. In the fourth embodiment, light components reflected by the patterning plate 35 are incident on the lens 34 to be focused by the lens, and are incident on the dispersive element 33. The dispersive element 33 works to multiplex the incident lights, and the multiplexed lights are emitted from an optical fiber 41 via a collimate lens 40.

Also in the third and fourth embodiments, as shown in FIG. 3B and FIG. 4B, a driver 42 may move the patterning plate 35 along the Z axis on the XZ plane to shift an incident position on the patterning plate 35 along the Z axis direction. In this manner, a transmission optical tunable filter in which spectral shapes of the filter change depending on movement of the patterning plate 35 can be realized. The moving direction of the patterning plate 35 is not limited to the Z axis direction, but may be moved on the XZ plane or may be rotated on the XZ plane. Here, the patterning plate 35 has the various transmission characteristics along the direction of the movement or the rotation, details thereof will be described below.

(Configuration of Patterning Plate)

Figure 5:
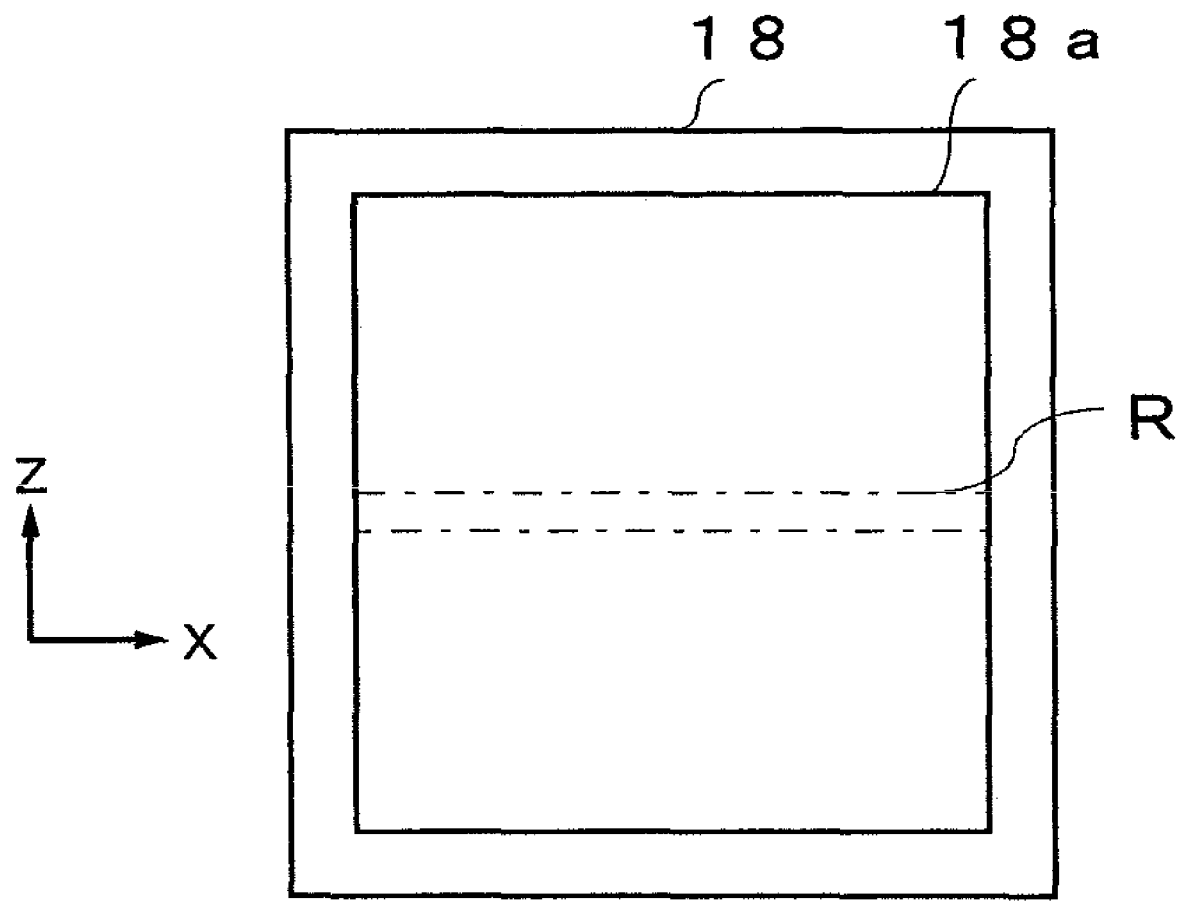
FIG. 5 is a view showing a pattern of a patterning plate and an incident position of a light.
Figure 6A:
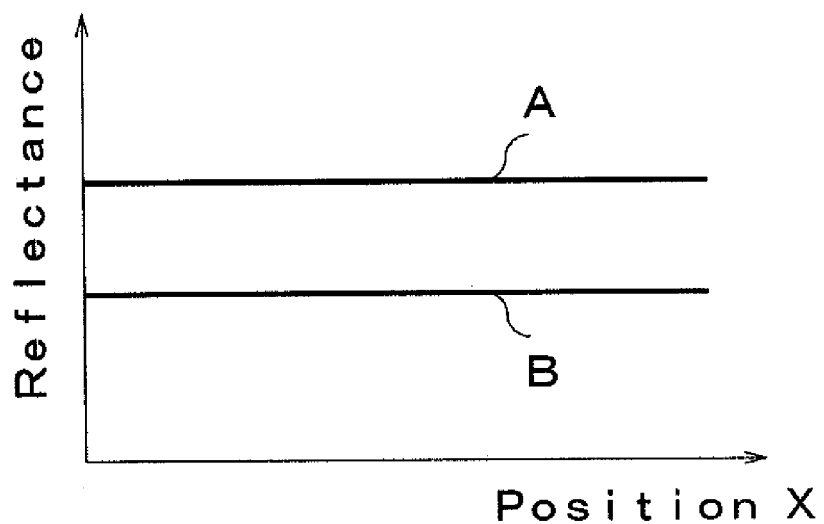
FIG. 6A is a graph showing a relationship between reflectance of this patterning plate and the incident position.
Figure 6B:
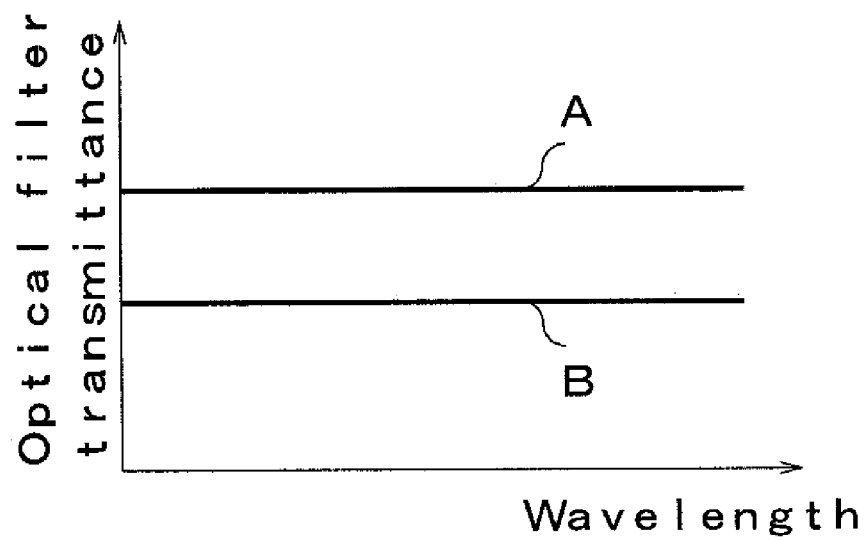
FIG. 6B is a graph showing a relationship between transmittance of an optical filter of this patterning plate and a wavelength.

The patterning plate of the reflection optical filter and the transmission optical tunable filter used in the first and second embodiments will be explained. In FIG. 5, the patterning plate 18 forms a pattern 18a in its central portion. When a light is dispersed depending on a wavelength and is incident on the patterning plate 18 as a parallel and belt-shaped light, an incident region R on the pattern 18a is a rectangular region shown by broken lines. Minute reflection particles for reflecting a light are provided on a surface of the pattern 18a. The reflection particles are adhered with uniformity all over the patterning plate 18, and various patterning plates of different densities are prepared. FIG. 6A is a view showing change of reflectance of two patterning plates at positions along the X axis direction. The reflectance of two patterning plates are different in each patterning plate as shown by straight lines A and B, however, each of the reflectance at any positions on the X direction is constant. The optical filter in the first and second embodiments can realize desired transmission characteristics by selecting the patterning plate 18 as shown in FIG. 6B, an incident light can be converted into an optical signal having a desired attenuation rate in entire wavelength band.

Figure 7A:
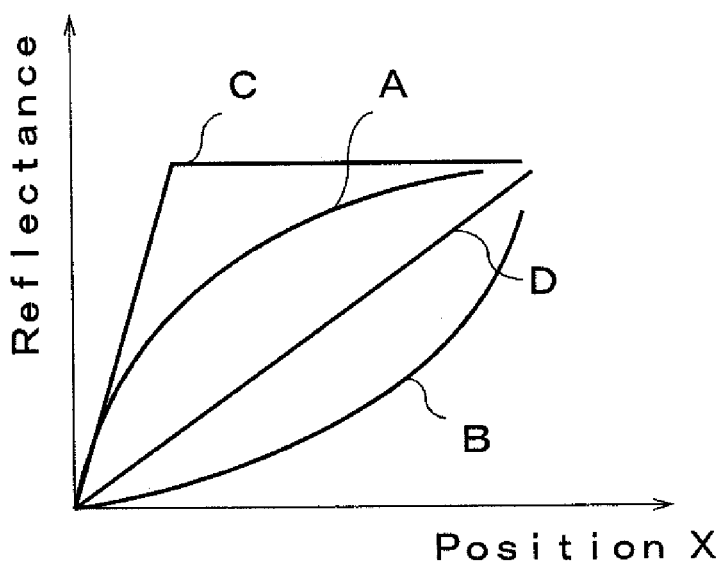
FIG. 7A is a graph showing a relationship between reflectance of another patterning plate and the incident position.
Figure 7B:
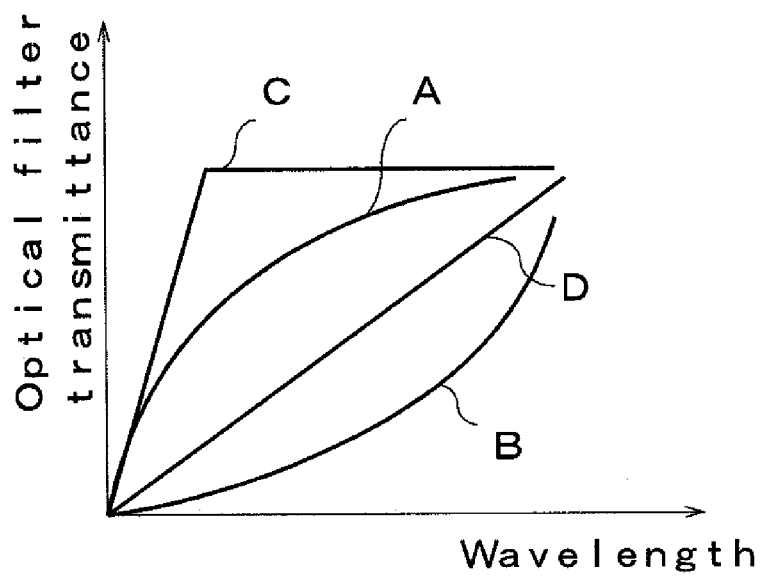
FIG. 7B is a graph showing a relationship between transmittance of an optical filter of another patterning plate and a wavelength.

Another example of the patterning plate will be explained. A distribution of reflectance in the patterning plate is not uniform, and different types of the patterning plates where the reflectance changes along the X axis direction at least in an incident region on which a light is incident as shown by curved lines A and B or straight lines C and D in FIG. 7A may be used. When the patterning plate is arbitrarily selected, the transmission characteristic of optical filter changes depending on the reflectance characteristics of the selected patterning plate as shown by curved line A or B or by straight line C or D in FIG. 7B. As described above, when the reflectance of the patterning plate changes at positions along the X axis direction, the wavelength transmission characteristics of optical filter can also change corresponding to the change of reflectance.

Figure 8:
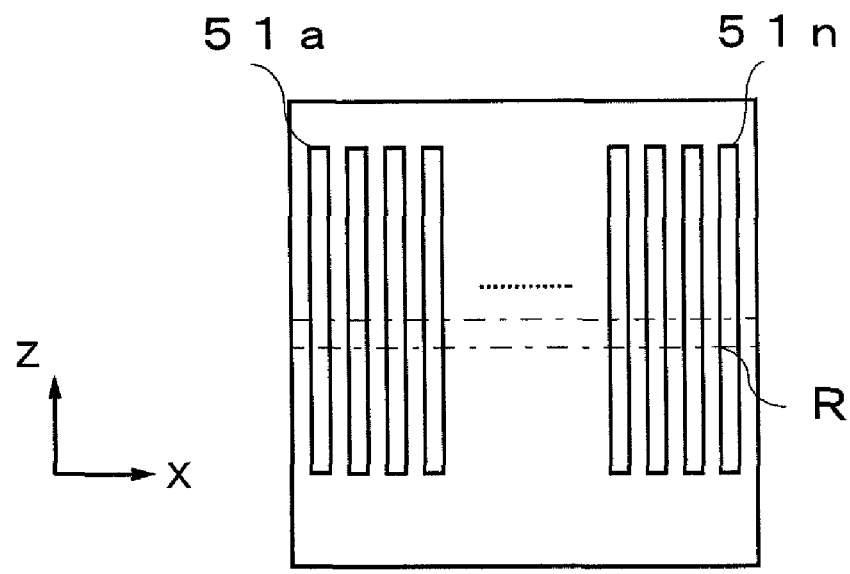
FIG. 8 is a view showing a pattern of another patterning plate and an incident position of a light.
Figure 9:
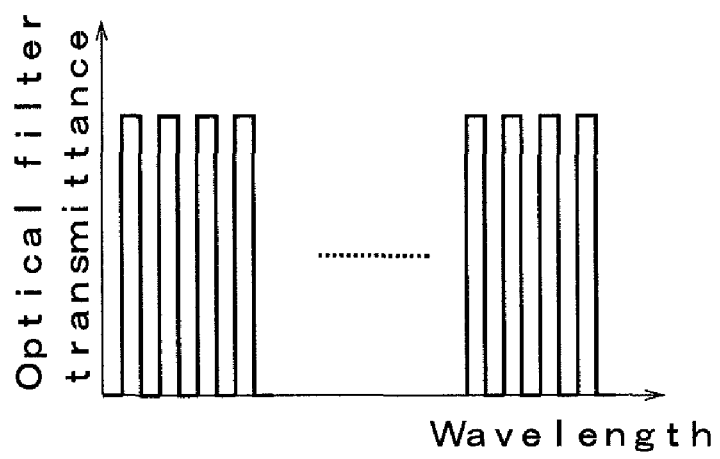
FIG. 9 is a graph showing a relationship between transmittance of an optical filter using this patterning plate and a wavelength.

FIG. 8 shows a pattern of another patterning plate. In this patterning plate, a plurality of long and straight regions 51a to 51n with reflectance of 100% are provided at equal intervals in parallel with the Z axis direction. Here, when a light is incident on the reflection areas 51a to 51n in the patterning plate, the incident light is directly reflected to be applied to an output side. In addition, a light incident on an area between the reflection areas is not reflected and is not applied to the optical fiber 15. Accordingly, in an optical filter using the patterning plate 18, wavelength selection characteristics in a shape of rectangular wave shown in FIG. 9 are obtained.

Figure 11A:
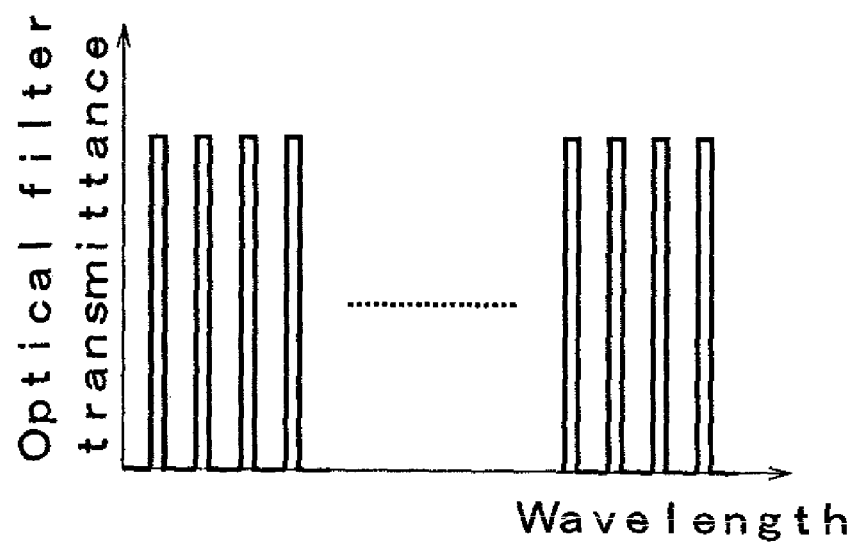
FIG. 11A is a graph showing a relationship between transmittance of an optical filter using this patterning plate and a wavelength.
Figure 11B:
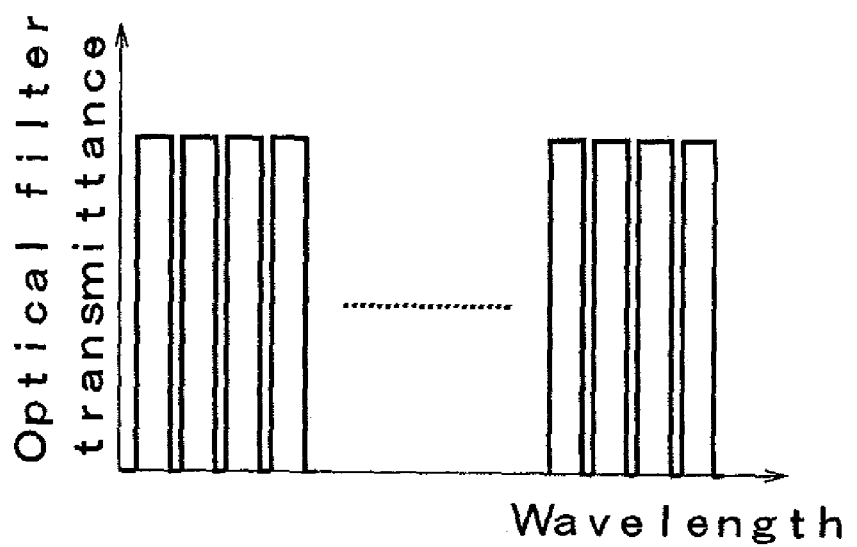
FIG. 11B is a graph showing the relationship between transmittance of the optical filter using this patterning plate and the wavelength.

FIG. 10 shows a reflection pattern of further another patterning plate. In this case, widths of reflection areas 52a to 52n with reflectance of 100% are shaped to be gradually narrow toward an positive direction of the Z axis, respectively. On this occasion, the patterning plate 18 is configured so as to be moved in the Z axis direction by adding the driver 19 shown by a broken line in FIG. 1 and FIG. 2. According to this, when a light is incident on the patterning plate 18, a width of passband corresponding to the width of reflection area can be obtained. That is, when the patterning plate is moved to a plus direction in the Z axis direction and an incident position of light is at a position R1, a selection characteristic where widths for selecting wavelengths are narrow as shown in FIG. 11A is obtained. Then, in FIG. 10, when the patterning plate is moved to a minus Z direction so that the incident position of light, for example, can be at a position R2, the width of passband can be broadened as shown in FIG. 11B.

Figure 12:
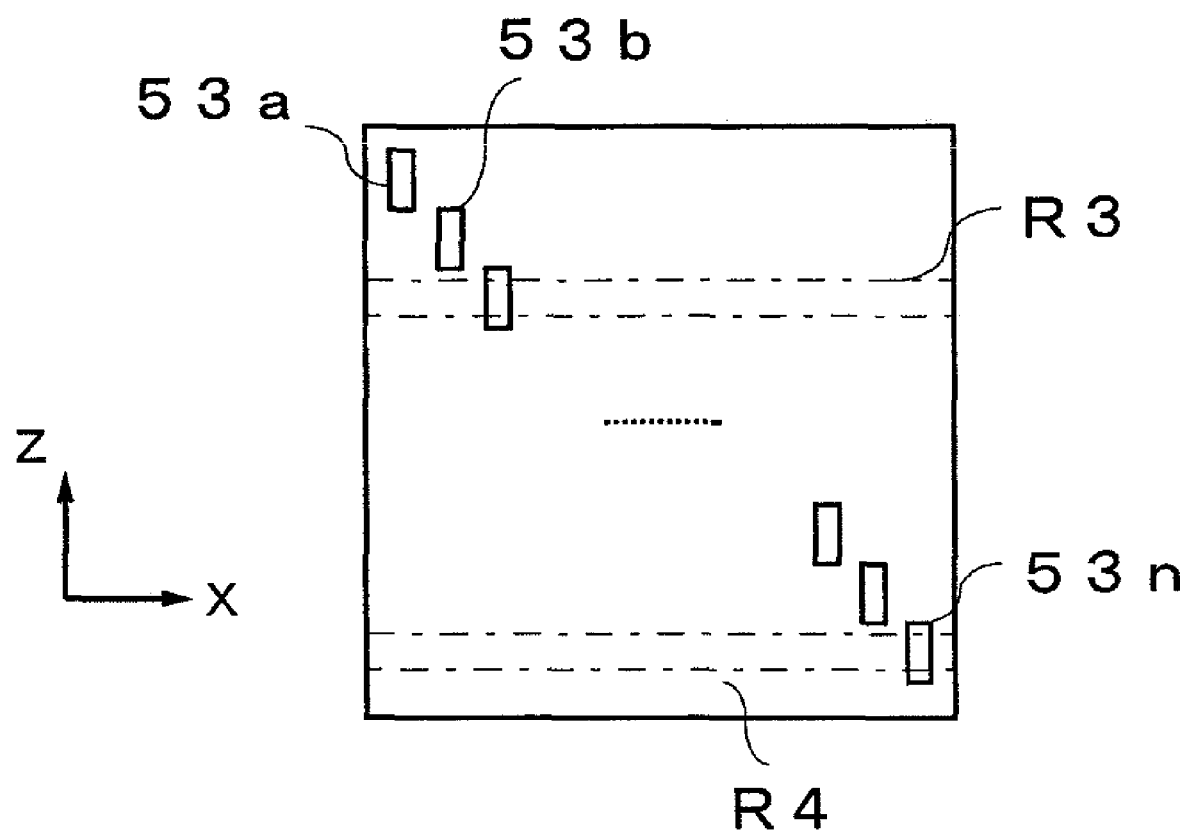
FIG. 12 is a view showing a pattern of another patterning plate and an incident position of a light.
Figure 13A:
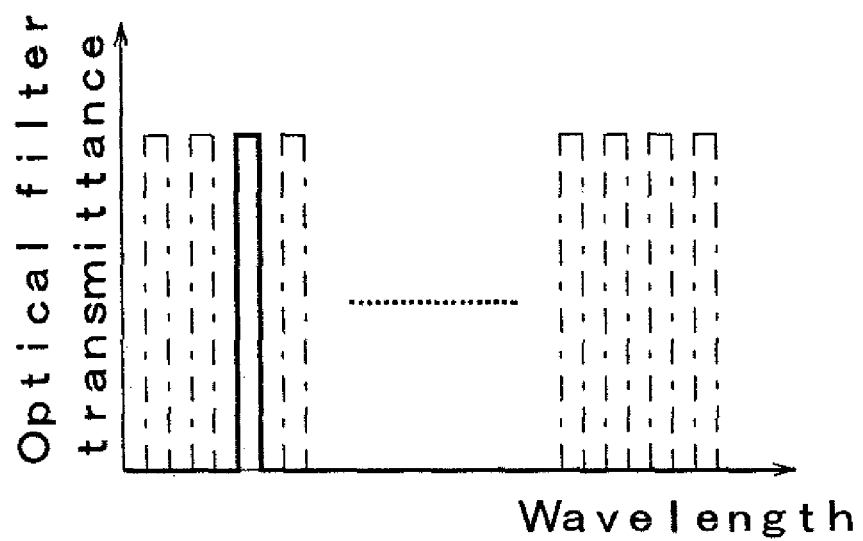
FIG. 13A is a graph showing a relationship between transmittance of an optical filter using this patterning plate and a wavelength.
Figure 13B:
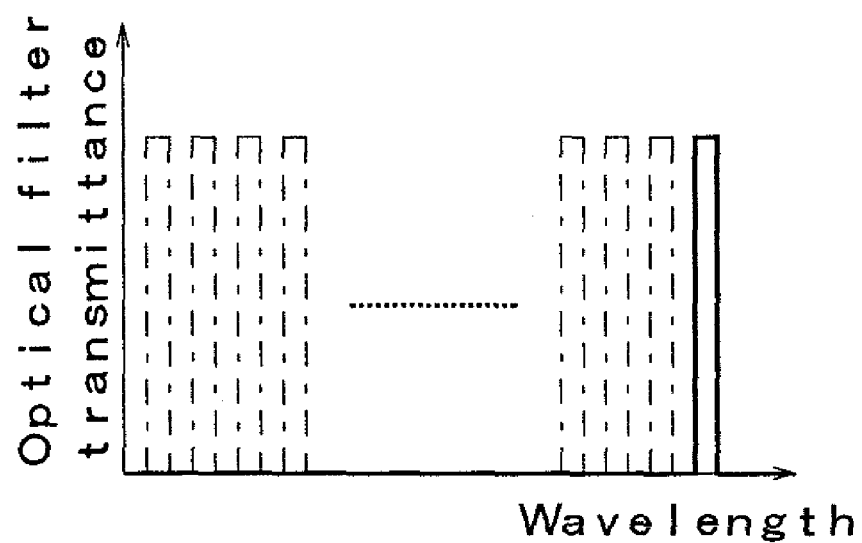
FIG. 13B is a graph showing the relationship between transmittance of the optical filter using this patterning plate and the wavelength.

In addition, as shown in FIG. 12, reflection patterns 53a to 53n of the patterning plate may be formed on a diagonal line with respect to the Z axis direction and the X axis direction. In this case, only a light from any one of the reflection regions overlapping with the incident region passes the optical tunable filter by moving the patterning plate in the Z axis direction. In a case where the incident region, for example, is R3 or R4 shown in FIG. 12, the optical tunable filter has characteristics shown in FIG. 13A and FIG. 13B and a wavelength of passband can be discontinuously changed by the driver 19.

Figure 14:
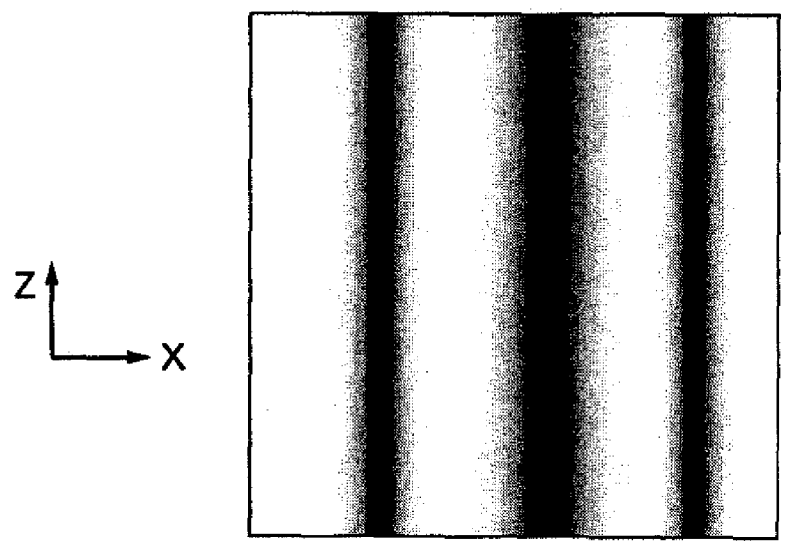
FIG. 14 is a photographic view showing an example of a pattern of another patterning plate.
Figure 15:
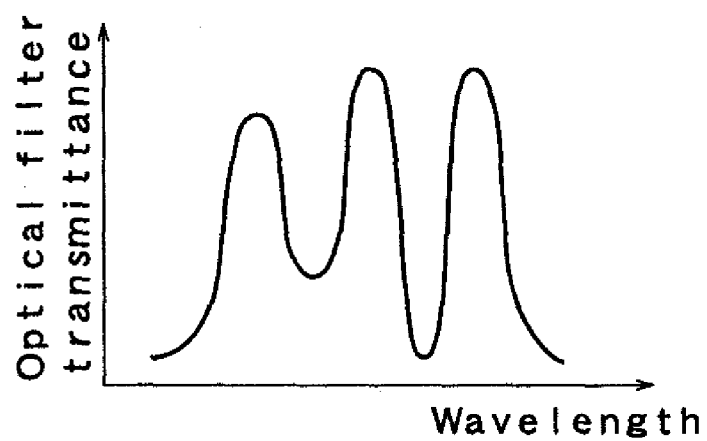
FIG. 15 is a graph showing a relationship between transmittance of an optical filter using this patterning plate and a wavelength.

FIG. 14 is a view showing an example of another pattern of the patterning plate. As shown in the figure, the patterning plate has reflectance characteristics parallel with the Z axis and continuously changing at positions along the X axis direction. When this patterning plate is used, the optical filter has the transmission characteristics shown in FIG. 15 same as the reflectance characteristics of the patterning plate. In a case where an optical amplifier is used, when the transmittance of light is set to be inverted characteristics of the optical amplifier, the characteristics of optical amplifier is cancelled in passing this filter and a spectrum of a constant level can be obtained.

Figure 16:
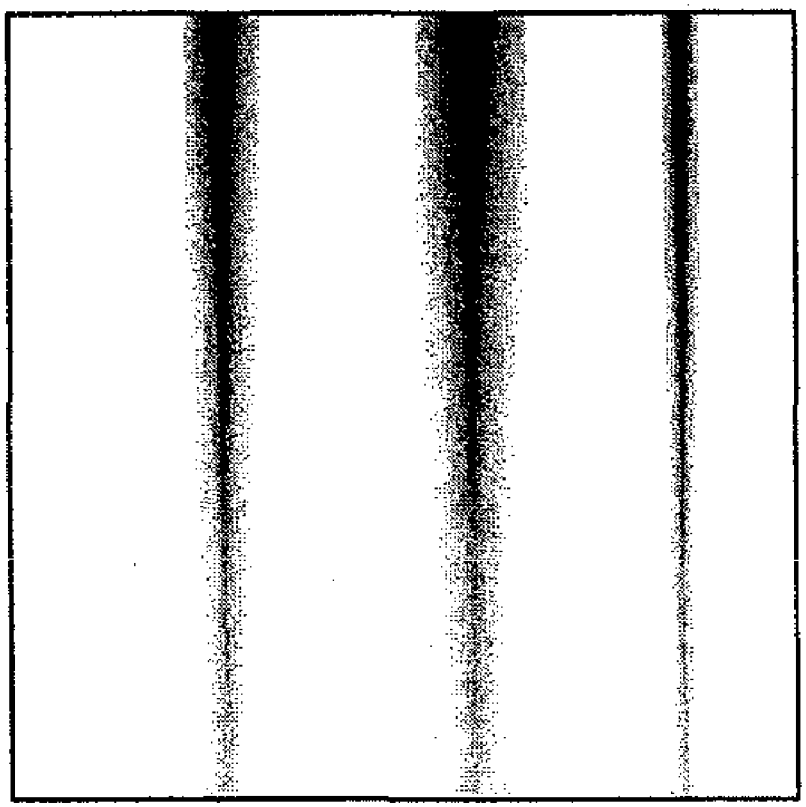
FIG. 16 is a photographic view showing an example of a pattern of another patterning plate.

FIG. 16 is a view showing an example of another pattern of the patterning plate. This patterning plate has reflectance different at positions along the X axis direction. And, the patterning plate gradually changes a level of the reflectance along the Z axis direction. That is, in various positions in the Z axis direction in FIG. 16, the reflectance at a position in the X axis direction gradually increases toward the positive direction of the Z axis. Wavelength selection characteristics such as shown in FIG. 17A are obtained by employing this patterning plate 18 to the optical tunable filter as shown in FIG. 1B and FIG. 2B and by moving an incident position relatively toward a positive direction of the Z axis. In the same manner, when the incident position is moved to a position in a negative direction of the Z axis by the driver 19, the transmittance characteristics of the optical filter shown in FIG. 17B is obtained. The characteristic of the transmittance changes continuously between those of FIGS. 17A and 17B.

Figure 19A:
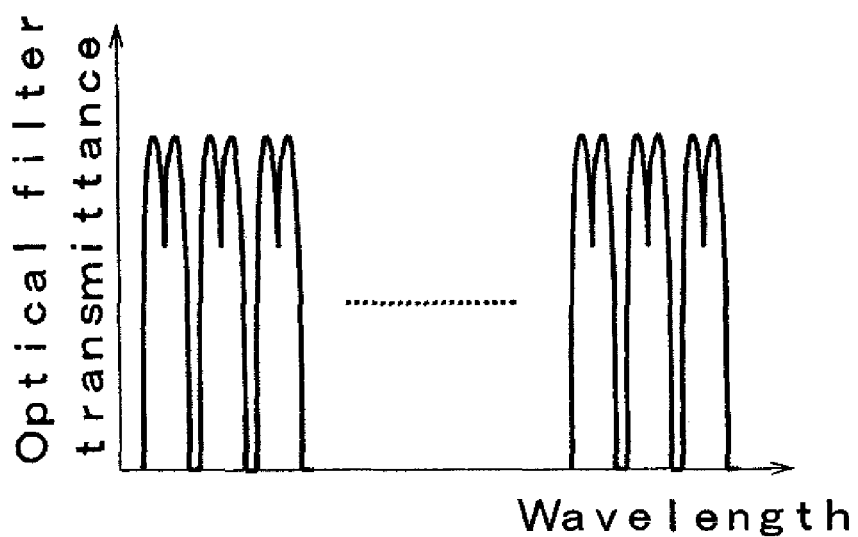
FIG. 19A is a graph showing a relationship between transmittance of an optical filter using this patterning plate and a wavelength.
Figure 19B:
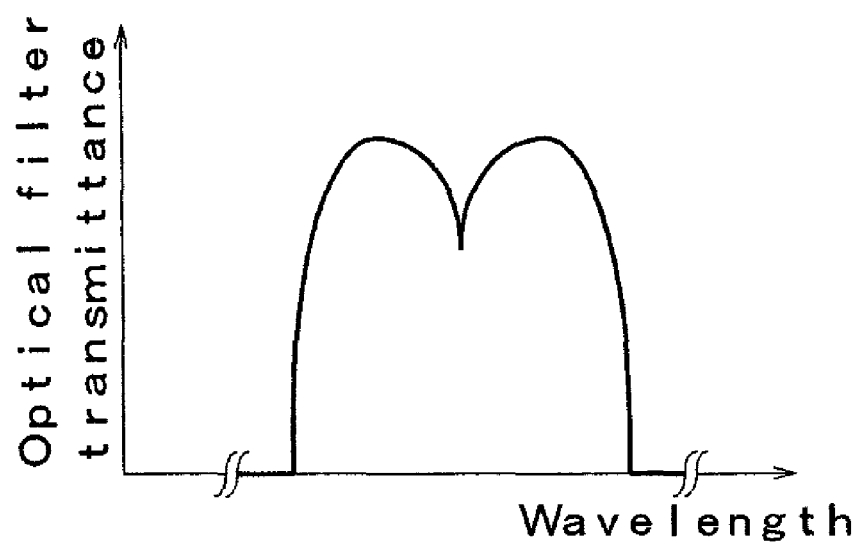
FIG. 19B is a graph showing the relationship between the transmittance of the optical filter using this patterning plate and the wavelength.

FIG. 18 is a view showing an example of another pattern of another patterning plate. In this pattern, a plurality of reflection regions 54a to 54n are provided at constant intervals in parallel with the Z axis. A slit-like region with low reflectance is further formed in a central portion of the respective reflection region. The light filter can obtain transmission characteristics shown in FIG. 19A by using this patterning plate. Here, FIG. 19B shows one selected wavelength portion enlarged along a wavelength axis. A level of lowering the transmittance of the central portion in the respective selective regions of light shown in FIG. 19A can be changed by arbitrarily selecting the width of the slit of the respective reflection region.

Figure 21A:
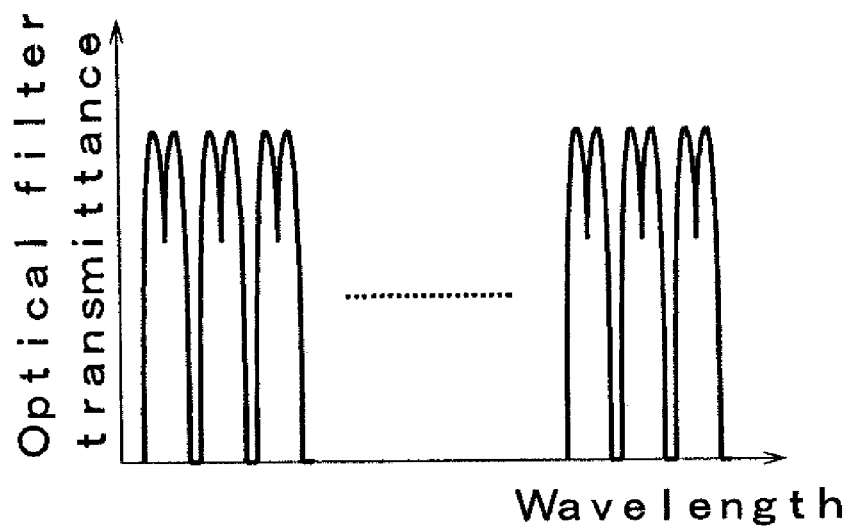
FIG. 21A is a graph showing a relationship between transmittance of an optical filter using this patterning plate and a wavelength.
Figure 21B:
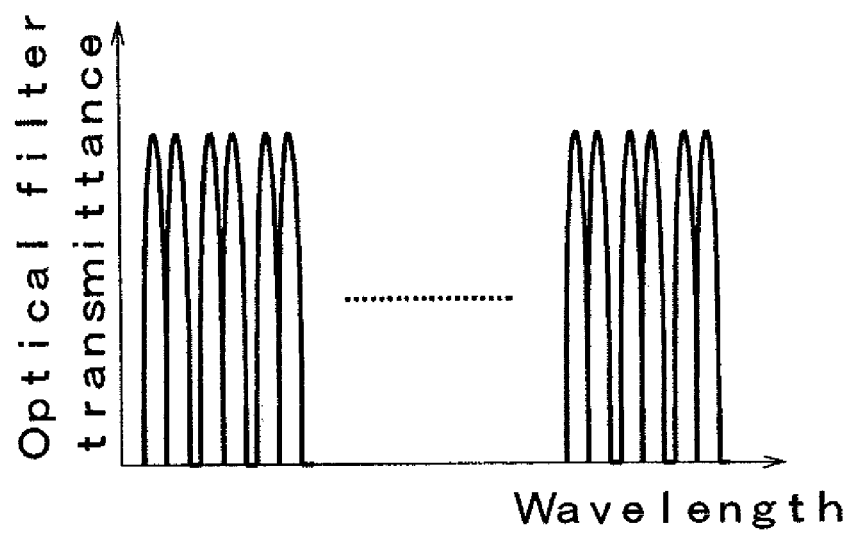
FIG. 21B is a graph showing the relationship between the transmittance of the optical filter using this patterning plate and the wavelength.

FIG. 20 is a view showing an example of another pattern of this patterning plate, and a plurality of reflection regions parallel with the Z axis exist in the respective patterning plates. A slit-like region with low reflectance is formed in the respective reflection regions so as to be narrow toward the positive direction of Z axis. In the first and second embodiments, when the driver 19 moves this patterning plate toward the Z axis direction, a level of lowering the transmittance of the center in the selected region can be continuously changed as shown in FIG. 21A and FIG. 21B.

Figure 22:
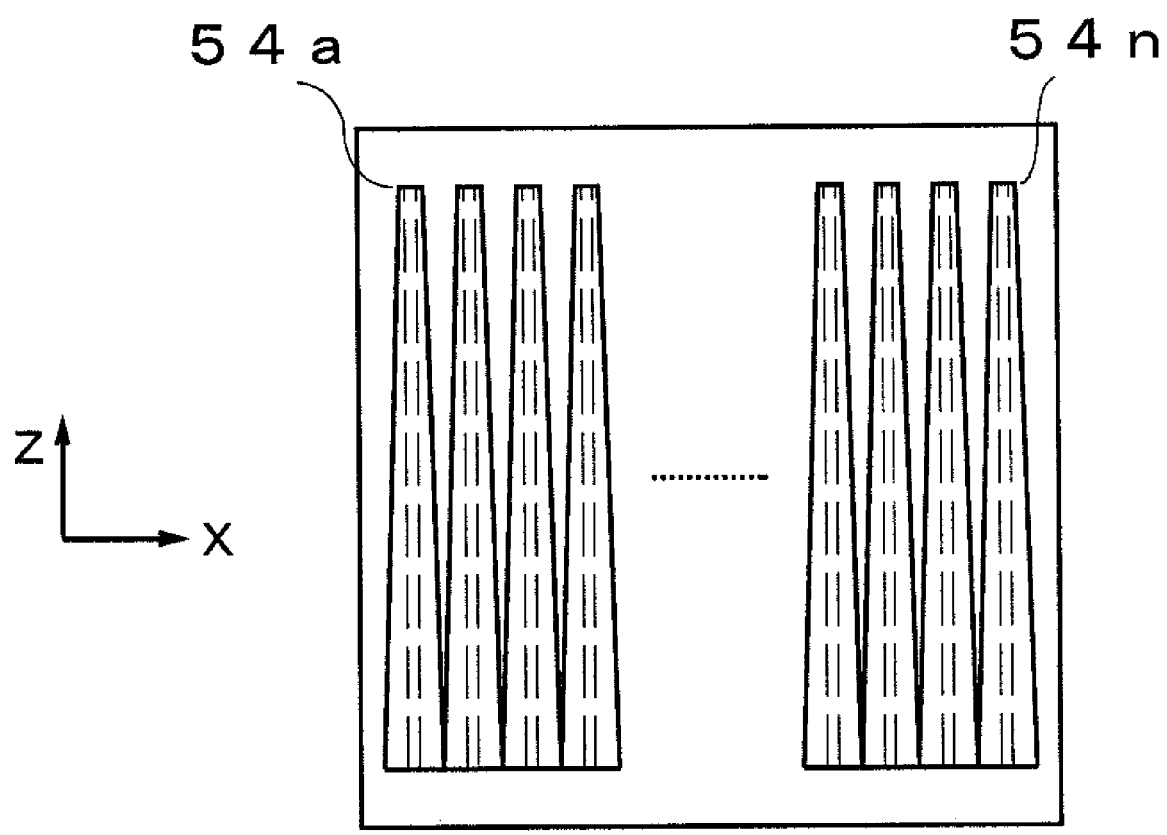
FIG. 22 is a view showing another example of pattern of a patterning plate.
Figure 23A:
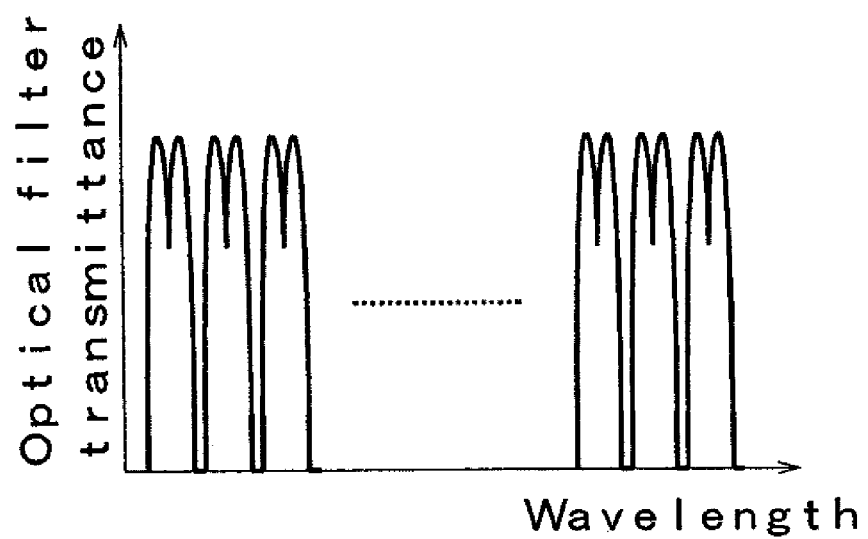
FIG. 23A is a graph showing a relationship between transmittance of an optical filter using this patterning plate and a wavelength.
Figure 23B:
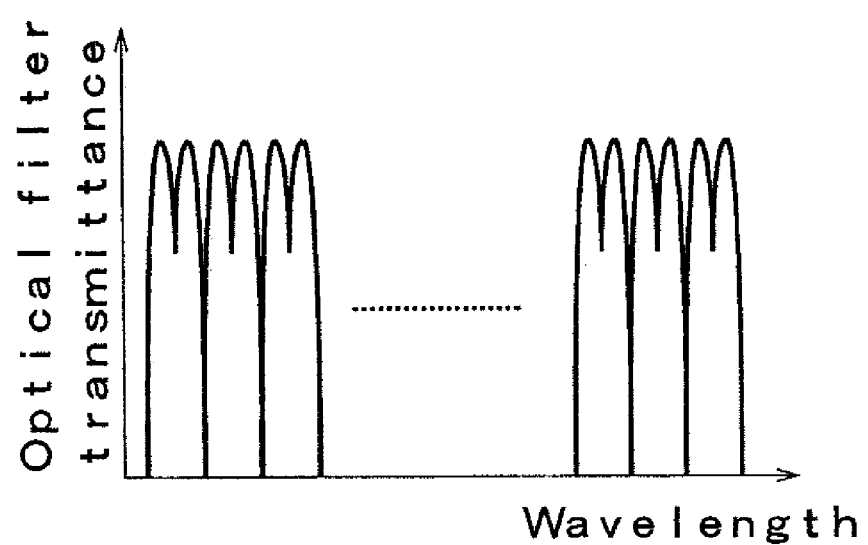
FIG. 23B is a graph showing the relationship between the transmittance of the optical filter using this patterning plate and the wavelength.

FIG. 22 is a view showing an example of another pattern of another patterning plate. In this example, a width of the reflection region of patterning plate is changed and a width of the slits of respective reflection regions is constant. According to this, when the driver 19 moves the patterning plate 18 toward the Z axis direction, a width of passband for selecting lights of each wavelength can become broad and narrow as shown in FIG. 23A and FIG. 23B.

Figure 24:
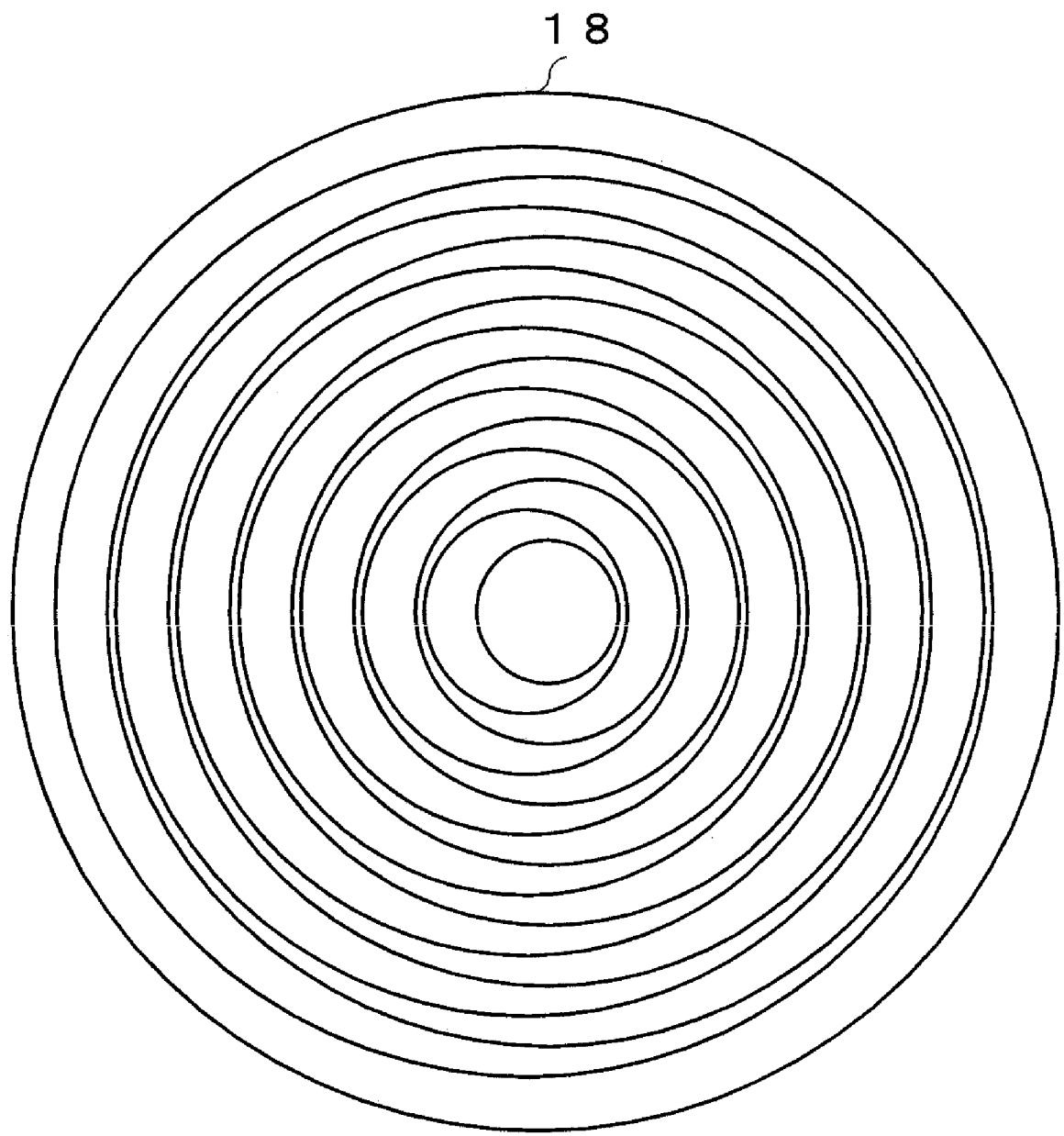
FIG. 24 is a view showing another example of pattern of a patterning plate.
Figure 25A:
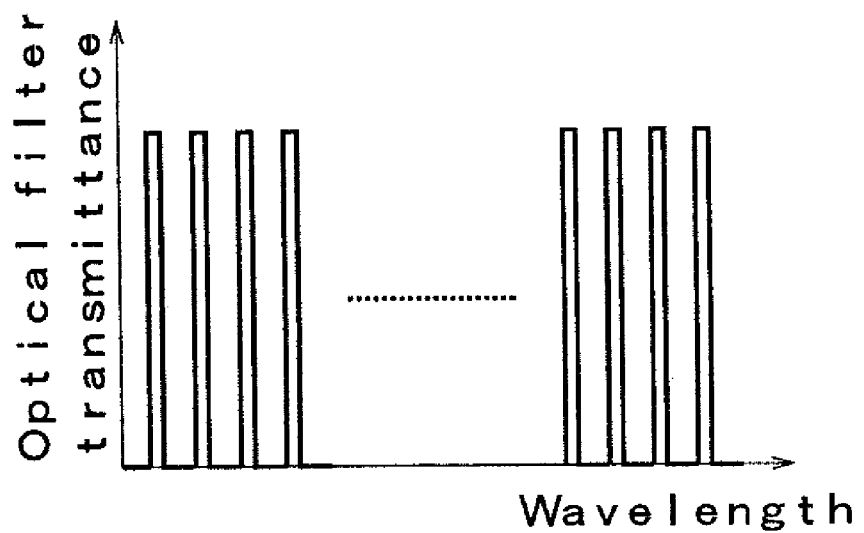
FIG. 25A is a graph showing a relationship between transmittance of an optical filter using this patterning plate and a wavelength.
Figure 25B:
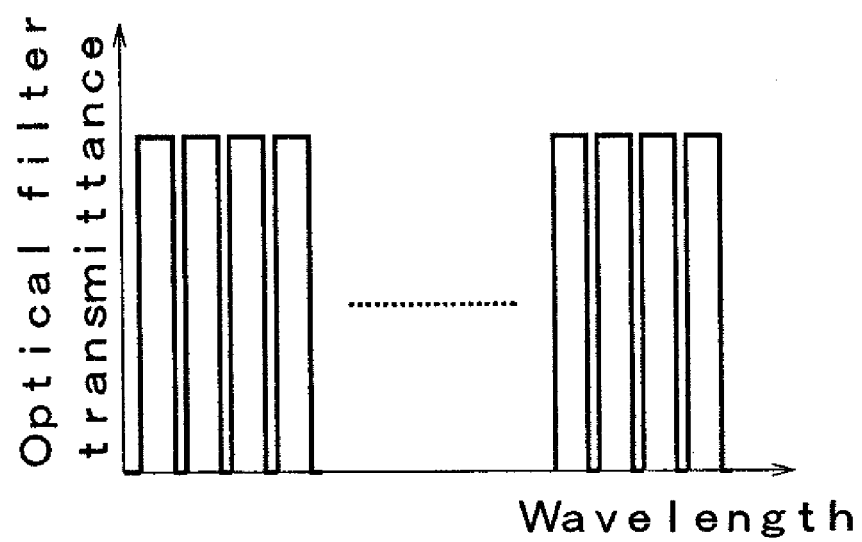
FIG. 25B is a graph showing the relationship between the transmittance of the optical filter using this patterning plate and the wavelength.

FIG. 24 is a view showing a patterning plate which is a circular disk and rotatable around a center and is rotated by the driver 19. A plurality of concentric ring shaped reflection regions having a width changing along a certain radius direction are formed on this patterning plate. According to this, a transmittance of an optical tunable filter can be continuously changed by rotating the patterning plate 18 half around the center axis because the transmission width continuously changes from a narrow state to a broad state as shown in FIG. 25A and FIG. 25B.

Figure 27A:
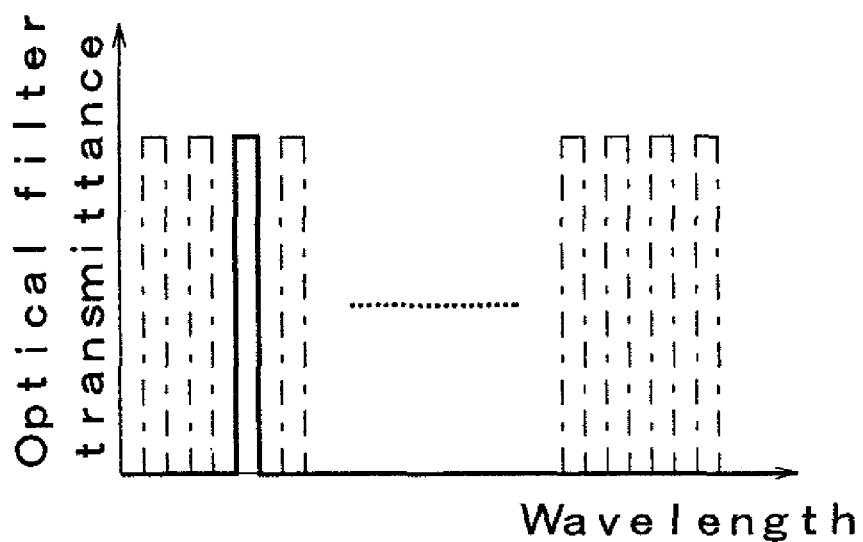
FIG. 27A is a graph showing a relationship between transmittance of an optical filter using this patterning plate and a wavelength.
Figure 27B:
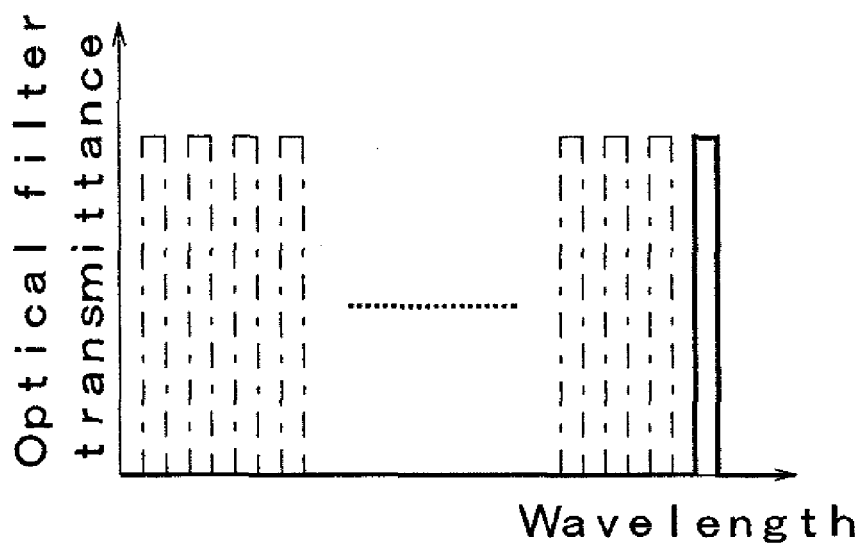
FIG. 27B is a graph showing the relationship between the transmittance of the optical filter using this patterning plate and the wavelength.

FIG. 26 is a view showing another example of a disk shaped patterning plate. In this example, the discoid patterning plate is configured to be rotatable around the center of the plate, and minute rectangular reflection regions are formed on the circle perpendicularly with a radius at points of distance different along a radius direction. These reflection regions are spirally arranged as a whole. When this patterning plate is rotated, characteristics of the optical tunable filter can discontinuously change a wavelength of passband by the driver 19 as shown in FIG. 27A and FIG. 27B.

The shapes of patterning plate and the positions of reflection region explained above are examples. By configuring the reflection region of patterning plate according to desired filter characteristics, a reflective optical filter of arbitrary characteristics can be obtained.

The above described various patterning plates are used as the patterning plate 18 for the reflective optical filter and the optical tunable filter according to the first and second embodiments. When the respective reflection regions are replaced by the transmission regions and their transmittance are variously changed, the patterning plate 35 can be obtained and directly applied to the transmission optical filter according to the third and fourth embodiments. In this case, a portion having a transmittance of 100% may be merely an opening portion.

Next, a method for changing a reflectance of the above described patterning plate will be explained. The patterning plate can be configured by applying particles with a reflex function. On this occasion, as shown in FIG. 28, the reflectance may be changed by changing a shape of the reflection particle or by changing a density of the reflection particles with identical shape. When the reflectance is fixed to 100%, the entire patterning plate is covered with the reflection particles. Further as shown in FIG. 29, the reflectance may be changed by changing a thickness of reflection film on the patterning plate. The patterning plate 35 employing the transmittance is formed in the same manner.

As described above, the patterning plate 18 reflects lights of predetermined wavelengths at predetermined reflectance, and the patterning plate 35 transmits lights of predetermined wavelengths at predetermined reflectance.

Fifth Embodiment

Figure 30A:
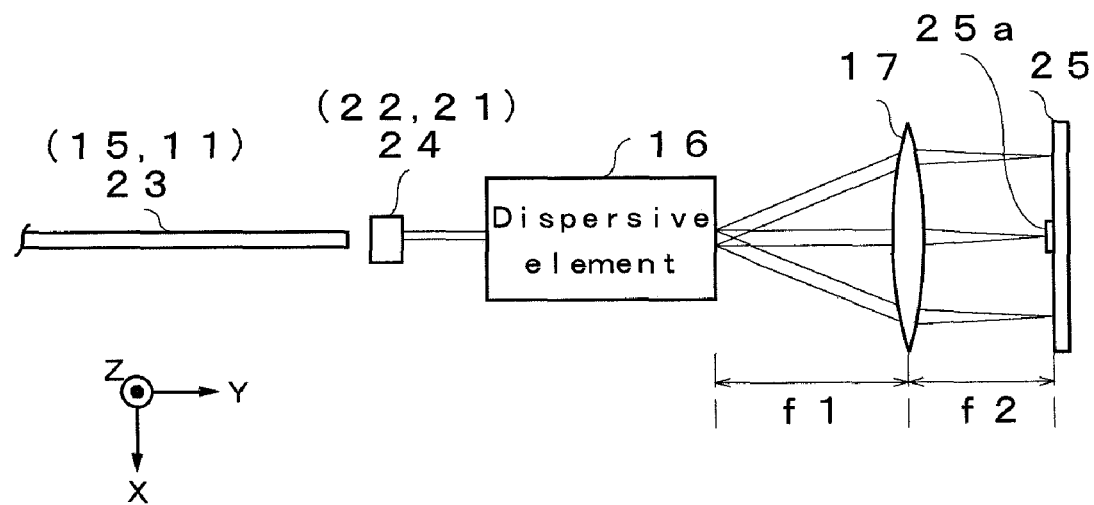
FIG. 30A is a side view seen from a Z axis direction of a reflective optical filter according to a fifth embodiment of the present invention.
Figure 30B:
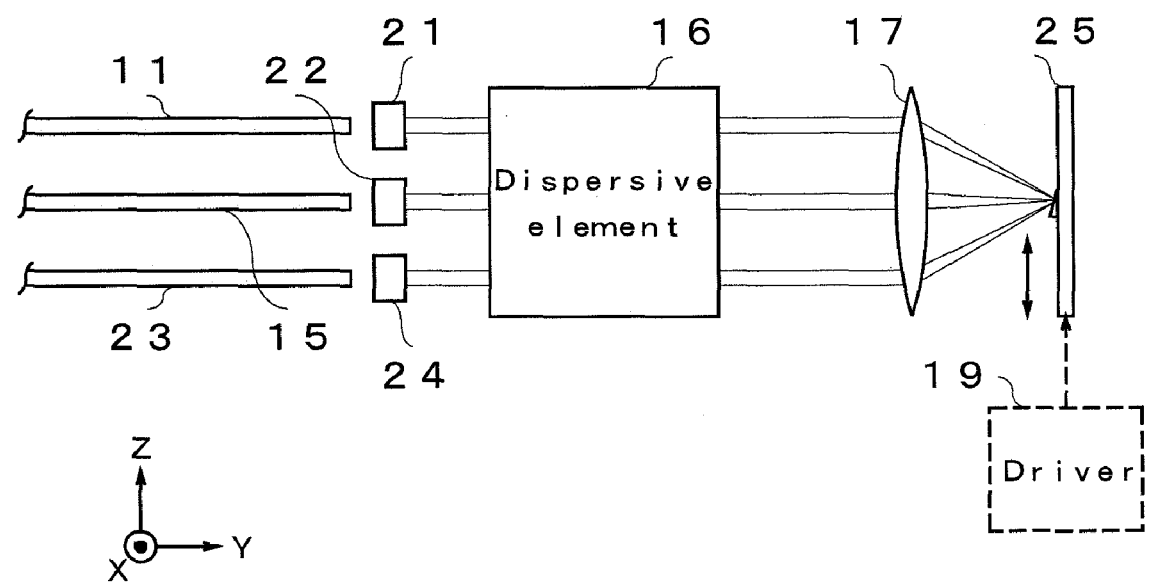
FIG. 30B is a side view seen from an X axis direction of the reflective optical filter according to the fifth embodiment of the present invention.

Referring to FIG. 30A and FIG. 30B, a reflective optical filter according to a fifth embodiment of the present invention will be explained. In this embodiment, explanation of the portions identical with those of the above described second embodiment is omitted by adding the identical numerals to the portions. A collimate lens 21 is provided to an end portion of the optical fiber 11 for guiding an incident light, and collimator lenses 22 and 24 are provided to the optical fiber 15 and an optical fiber 23 for guiding an emitted light. A patterning plate 25 has a wedge-shaped region 25a having a triangular cross section partially on an incident region of light. The wedge-shaped region 25a differentiates a reflection angle of selected light from a reflection angle of non-selected light as shown in FIG. 30A and FIG. 30B. When a light is incident on a planar portion of the patterning plate 25, the light is directly applied to the lens 17 as the non-selected light and is emitted to an optical fiber 23 through the dispersive element 16 and the collimator lens 24. In addition, a light incident on the wedge-shaped region 25a is applied to the lens 17 and the optical fiber 15 through the dispersive element 16 and the collimator lens 22. In this manner, the patterning plate 25 can separate the selected light from the non-selected light. The patterning plate 25 can change the reflection angle of selected light by changing an angle of this wedge-shaped portion.

Figure 31A:
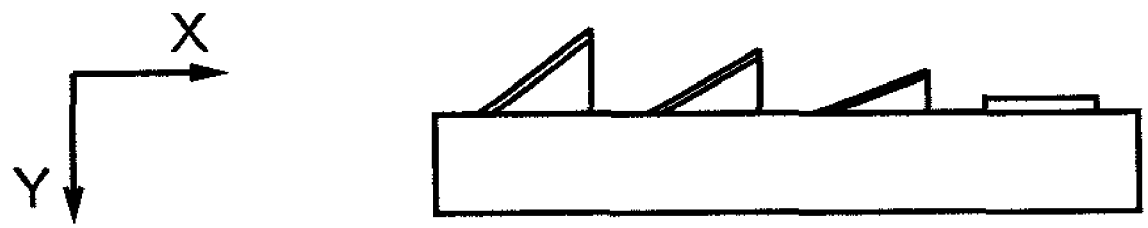
FIG. 31A is a view showing an example of manufacturing a shape of a patterning plate.
Figure 31B:
FIG. 31B is a view showing another example of manufacturing a shape of a patterning plate.

In this case, as shown in FIG. 31A, when having a wedge angle according to each wavelength formed by changing an angle of the wedge-shaped portion, the patterning plate 25 can reflect lights to directions different from each other and can separate the lights. In addition, as shown in FIG. 31B, it is possible to change a level of reflection by continuously changing an inclination angle.

In the fifth embodiment, as shown by a broken line in FIG. 30A, the patterning plate 18 may be moved along the Z axis direction by the driver 19 shown by a broken line on the XZ plane. And, when the patterning plate 18 has various reflection characteristics arranged along the Z axis direction, the reflection characteristics can be changed in accordance with movement of the patterning plate 18, resulting in realization of a reflective optical tunable filter having various spectrum shapes. The moving direction of the patterning plate 18 is not limited to the Z axis direction. The patterning plate 18 may be moved in the XZ plane or may be rotated in the XZ plane.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2007-322878 filed on Dec. 14, 2007 is hereby incorporated by reference.

What is claimed is:

1. An optical filter comprising:
   a dispersive element for dispersing an incident light for each wavelength of the light to emit the dispersed light and for multiplexing selected reflected lights again toward an opposite direction of said incident light;

a focusing element for focusing lights of wavelengths dispersed for each wavelength by said dispersive element on an identical plane with keeping a relative relationship of incident position; and a patterning plate which is provided at a position where belt-shaped lights from said focusing element are focused on and which reflects lights of predetermined wavelengths at predetermined reflectance.

2. The optical-filter according to claim 1, further comprising:

a circulator for making a light incident on said dispersive element and for emitting the reflected light multiplexed by said dispersive element toward a direction different from that of said incident light.

3. The optical filter according to claim 1, wherein said patterning plate reflects a light of wavelength to be selected to said dispersive element and reflects lights of other wavelengths toward different directions.

4. The optical filter according to claim 1, wherein said patterning plate forms a reflection pattern by changing at least one of a density of reflection particles on its surface and a thickness of reflection film on its surface.

5. A optical filter comprising:

a first dispersive element for dispersing an incident light for each wavelength of the light to emit the dispersed light;

a focusing element for focusing lights of wavelengths dispersed for each wavelength by said first dispersive element on an identical plane with keeping a relative relationship of incident position;

a patterning plate which is provided at a position where belt-shaped lights from said focusing element are focused on and which transmits lights of predetermined wavelengths at predetermined transmittance;

a light collection element for collecting lights of respective wavelength which transmitted said patterning plate; and a second dispersive element for multiplexing dispersed lights collected by said light collection element.

6. The optical filter according to claim 5, wherein said patterning plate transmits a light of wavelength to be selected to said dispersive element and reflects lights of other wavelengths.

7. The optical filter according to claim 5, wherein said patterning plate forms a reflection pattern by changing at least one of a density of reflection particles on its surface and a thickness of reflection film on its surface.

8. An optical filter comprising:

a dispersive element for dispersing an incident light for each wavelength of the light to emit the dispersed light and for multiplexing selected reflected lights again toward an opposite direction of said incident light;

a focusing element for focusing lights of wavelengths dispersed for each wavelength by said dispersive element on an identical plane with keeping a relative relationship of incident position;

a patterning plate which is provided at a position where belt-shaped lights from said focusing element are focused on and which reflects lights of predetermined wavelengths at predetermined reflectance; and a driver for driving said patterning plate to be moved or to be rotated.

9. The optical filter according to claim 8, further comprising:

a circulator for making a light incident on said dispersive element and for emitting the reflected light multiplexed by said dispersive element toward a direction different from that of said incident light.

10. The optical filter according to claim 8, wherein said patterning plate reflects a light of wavelength to be selected to said dispersive element and reflects lights of other wavelengths toward different directions.

11. The optical filter according to claim 10, wherein said patterning plate forms a reflection pattern by changing at least one of a density of reflection particles on its surface and a thickness of reflection film.

12. A optical filter comprising:

a first dispersive element for dispersing an incident light for each wavelength of the light to emit the dispersed light;

a focusing element for focusing lights of wavelengths dispersed for each wavelength by said first dispersive element on an identical plane with keeping a relative relationship of incident position;

a patterning plate which is provided at a position where belt-shaped lights from said focusing element are focused on and which transmits lights of predetermined wavelengths at predetermined transmittance;

a light collection element for collecting lights of respective wavelength which transmitted said patterning plate;

a second dispersive element for multiplexing dispersed lights collected by said light collection element; and a driver for driving said patterning plate to be moved or to be rotated.

13. The optical filter according to claim 12, wherein said patterning plate transmits a light of wavelength to be selected to said dispersive element and reflects lights of other wavelengths.

14. The optical filter according to claim 12, wherein said patterning plate forms a reflection pattern by changing at least one of a density of reflection particles on its surface and a thickness of reflection film on its surface.

* * * * *